US009024972B1

(12) United States Patent
Bronder et al.

(10) Patent No.: US 9,024,972 B1
(45) Date of Patent: May 5, 2015

(54) AUGMENTED REALITY COMPUTING WITH INERTIAL SENSORS

(75) Inventors: Matthew L. Bronder, Bellevue, WA (US); Michael A. Dougherty, Issaquah, WA (US); Adam Green, Redmond, WA (US); Joseph Bertolami, Seattle, WA (US); Robert M. Craig, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 899 days.

(21) Appl. No.: 12/416,321

(22) Filed: Apr. 1, 2009

(51) Int. Cl.
*G06T 19/00* (2011.01)
*G06F 3/01* (2006.01)

(52) U.S. Cl.
CPC .............. *G06T 19/006* (2013.01); *G06F 3/012* (2013.01); *G06F 3/011* (2013.01)

(58) Field of Classification Search
CPC ........ G06T 19/006; G06F 3/011; G06F 3/012
USPC ......................................................... 345/633
See application file for complete search history.

(56) References Cited

U.S. PATENT DOCUMENTS

| 6,166,744 | A  | * | 12/2000 | Jaszlics et al. ................. | 345/629 |
| 7,298,378 | B1 | * | 11/2007 | Hagenbuch et al. .......... | 345/589 |
| 7,467,061 | B2 |   | 12/2008 | Satoh |  |
| 7,511,736 | B2 |   | 3/2009  | Benton |  |
| 2004/0028258 | A1 | * | 2/2004 | Naimark et al. .............. | 382/103 |
| 2004/0105573 | A1 |   | 6/2004 | Neumann |  |
| 2005/0190972 | A1 |   | 9/2005 | Thomas |  |
| 2006/0001543 | A1 | * | 1/2006 | Raskar et al. .............. | 340/572.1 |
| 2006/0221072 | A1 |   | 10/2006 | Se |  |
| 2006/0233423 | A1 | * | 10/2006 | Najafi et al. .................. | 382/103 |
| 2007/0081695 | A1 |   | 4/2007 | Foxlin |  |
| 2007/0276590 | A1 | * | 11/2007 | Leonard et al. ............... | 701/207 |
| 2008/0001918 | A1 | * | 1/2008 | Hsu et al. ...................... | 345/157 |

OTHER PUBLICATIONS

William A. Hoff, Khoi Nguyen, and Torsten Lyon; Computer vision-based registration techniques for augmented reality; 1996; Proceedings of Intelligent Robots and Computer Vision XV, SPIE vol. 2904, Nov. 18-22, 1996, Boston, MA, pp. 538-548.*
Suya You, Ulrich Neumann, and Ronald Azuma; Hybrid Inertial and Vision Tracking for Augmented Reality Registration; Mar. 13-17, 1999; IEEE Proceedings Virtual Reality, 1999; 8 pages.*
Masayuki Kanbara, Hirofumi Fujii, Haruo Takemura and Naokazu Yokoya; A Stereo Vision-based Augmented Reality System; Oct. 5, 2000-Oct. 6, 2000; IEEE and ACM International Symposium on Proceedings Augmented Reality, 2000, (ISAR 2000); pp. 97-100.*

(Continued)

*Primary Examiner* — Jeffrey A Brier
(74) *Attorney, Agent, or Firm* — Micah Goldsmith; Micky Minhas

(57) ABSTRACT

Example embodiments of the present disclosure provide techniques for receiving measurements from one or more inertial sensors (i.e. accelerometer and angular rate gyros) attached to a device with a camera or other environment capture capability. In one embodiment, the inertial measurements may be combined with pose estimates obtained from computer vision algorithms executing with real time camera images. Using such inertial measurements, a system may more quickly and efficiently obtain higher accuracy orientation estimates of the device with respect to an object known to be stationary in the environment.

20 Claims, 12 Drawing Sheets

(56) References Cited

OTHER PUBLICATIONS

Miguel Ribo, Peter Lang, Harald Ganster, Markus Brandner, Christoph Stock, and Axel Pinz; Hybrid Tracking for Outdoor Augmented Reality Applications; Nov./Dec. 2002; IEEE Computer Graphics and Applications; vol. 22, Issue: 6; pp. 54-63.*

Georg Klein and Tom Drummond; Tightly Integrated Sensor Fusion for Robust Visual Tracking; 2002; in Proc. British Machine Vision Conference (BMVC'02, Cardiff); pp. 787-796.*

Chen et al., "Structure and Motion by Fusion of Inertial and Vision-Based Tracking," http://www.emt.tugraz.at/~tracking/Publications/chen2004a.pdf, 2004, pp. 1-8.

Chai et al. "3-D Motion and Structure Estimation using Inertial Sensors and Computer Vision for Augmented Reality," submitted to Presence: Teleoperators and Envrionments, http://citeseerx.ist.psu.edu/viewdoc/download;jsessionid=8210CC35EA6B3CAB64989 7648216CA25?doi=10.1.1.22.2458&rep=rep1&type=pdf, downloaded Apr. 30, 2009, pp. 1-40.

Gustafsson et al., "Sensor Fusion for Augmented Reality," Report on Automatic Control at Linköpings Universitet, http://www.control.isy.liu.se/research/reports/2009/2875.pdf, Jan. 8, 2009, 3 pages.

Rehbinder et al., "Pose Estimation using Line-based Dynamic Vision and Inertial Sensors," IEEE Transactions on Automatic Control, vol. 48, No. 2, Feb. 2003, http://ieeexplore.ieee.org/stamp/stamp.isp?tp=&arnumber=178900&isnumber=26479, pp. 186-199.

Randeniya et al., "Calibration of Inertial and Vision Systems as a Prelude to Multi-Sensor Fusion," Transporation Research Part C 16, 2000, http://marathon.csee.usf.edu/~sarkar/PDFs/Carnera-INS-Calibration.pdf, pp. 255-274.

Hol et al., "Robust Real-Time Tracking by Fusing Measurements from Inertial and Vision Sensors," Report on Automatic Control at Linköpings Universitet, Sep. 20, 2007, http://www.control.isy.liu.se/research/reports/2007/2823.pdf, pp. 1-21.

"Technology, Computer Vision for Augmented Reality," Fraunhofer IGD, downloaded Apr. 27, 2009, http://www.igd.fraunhofer.de/technologies/7/, pp. 1-2.

* cited by examiner

AUGMENTED REALITY COMPUTING WITH INERTIAL SENSORS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the patent and trademark office patent files or records, but otherwise reserves all copyright rights whatsoever. The following notice shall apply to this document: Copyright © 2009, Microsoft Corp.

BACKGROUND

Personal electronics devices such as smartphones may be used globally across a plurality of networks. The spread of accessible data networks have enabled mobile device users to remain connected to their provider networks and thus all of the data and services available via the Internet and other networks. Such devices typically host a variety of applications such as video and audio applications, image capture devices, and location determination systems such as GPS. The personal electronics devices may also have access to location based services such as searching and mapping functions.

Augmented reality is the combining of real world data and computer generated data to create a merged user environment. Real world data may be collected using any suitable data collection means, such as a camera or microphone. This data may then be processed and combined with computer generated data to create the user environment. One type of augmented reality is the use of live video images captured with a camera and processed and augmented with computer-generated graphics or other images. The resulting augmented video images are then presented to a user through a user interface, such as a video monitor. Augmented reality can be used in video games, mapping, navigation, advertising, and numerous other applications. Furthermore, mobile devices may have access to data that may be used to augment such applications based on the user's location and other criteria.

In order to provide such location based services, the location and orientation of the user or the user's device may be determined. Augmented reality algorithms may be used to process the real time images to determine the location and orientation of stationary features in the augmented scene and determine the cameras pose with respect to those features. However, some issues can arise when the location and orientation estimates calculated by the algorithms do not yield consistent results. In some cases the augmented objects may not be displayed in the expected location or otherwise be subjected to jitter and other undesired effects.

SUMMARY

In various embodiments, systems, methods, and computer-readable media are disclosed for receiving measurements from one or more inertial sensors (i.e. accelerometer and angular rate gyros) attached to a device with a camera or other environment capture capability. In one embodiment, the inertial measurements may be combined with pose estimates obtained from augmented reality algorithms executing with real time camera images. Using such inertial measurements, a system may more quickly and efficiently obtain higher accuracy orientation estimates of the device with respect to an object known to be stationary in the environment.

In one embodiment, when a user views a particular object or landmark on a device with image capture capability, information may be presented through rendering means such as a traditional web browser, rendered as a 2D overlay on top of the live image, and rendered in augmented reality into the physical environment. The resulting image may be generated by combining data from the camera and the inertial sensors to more accurately place augmented reality objects in the image. Furthermore, by using the inertial measurements the complexity and expense of augmented reality algorithms may be reduced, in particular if the algorithms cannot process frames at the full frame rate of the camera or there is too much latency induced by the algorithm. In one embodiment, the data from the inertial sensors can be used between processed frames to more accurately interpolate the pose of the device in real time. In further embodiments, augmented reality algorithms may be modified to enable faster tracking of a region of interest for camera images by utilizing motion measurements obtained from the inertial sensors. For example, the algorithm may not have to search all of the pixels in an image for previously recognized features since the inertial measurements may provide an indication of their location in the current frame.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION OF ILLUSTRATIVE EMBODIMENTS

Figure 1:
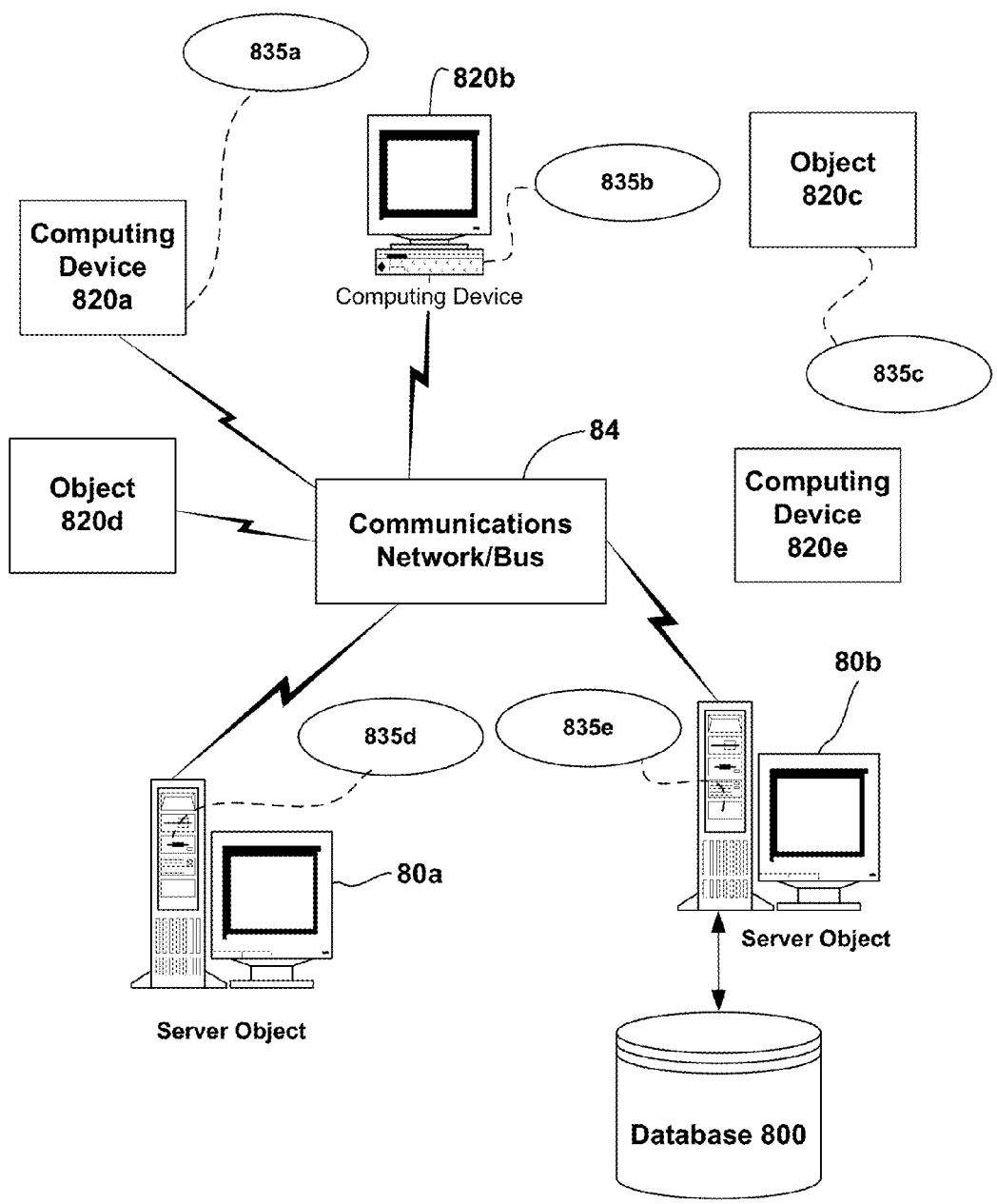
FIG. 1 is a block diagram representing an exemplary network environment having a variety of computing devices in which the present disclosure or parts thereof may be implemented.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Augmented Reality Computing

Augmented reality is directed to the combination of real world and computer generated data, wherein computer graphics objects may be blended into real world imagery. Augmented reality typically uses live video imagery which is digitally processed and augmented by the addition of computer graphics in real time or near real time. In contrast to virtual reality, which creates complete computer-generated environments in which the user is immersed, augmented reality adds graphics, sounds, haptics and the like to captured media of real world objects. The computer-simulated environment may be a simulation of the real world or a virtual world. Virtual reality environments are typically visual experiences, displayed either on a computer screen or through special or stereoscopic displays. Some virtual reality simulations may include additional sensory information such as audio through speakers or headphones. In an augmented reality system, graphics, audio and other sense enhancements may be superimposed over a real-world environment in real-time. Users may interact with the augmented environment or virtual artifact using standard input devices such as a keyboard and mouse or through other multimodal devices.

Figure 3:
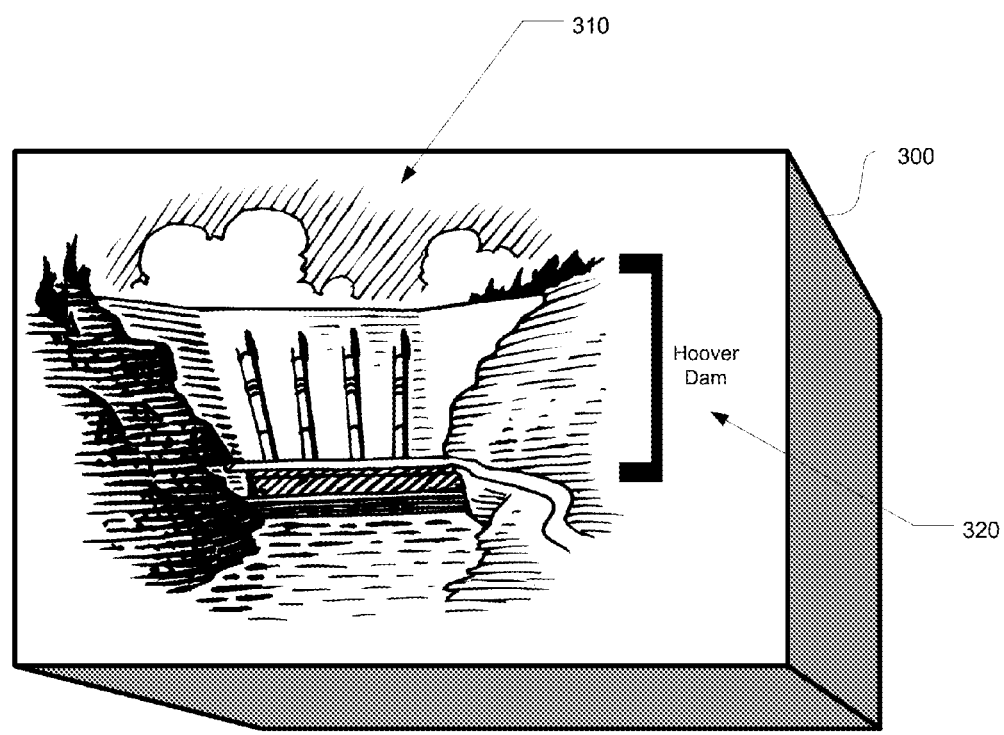
FIG. 3 depicts an exemplary augmented reality display.
Figure 4:
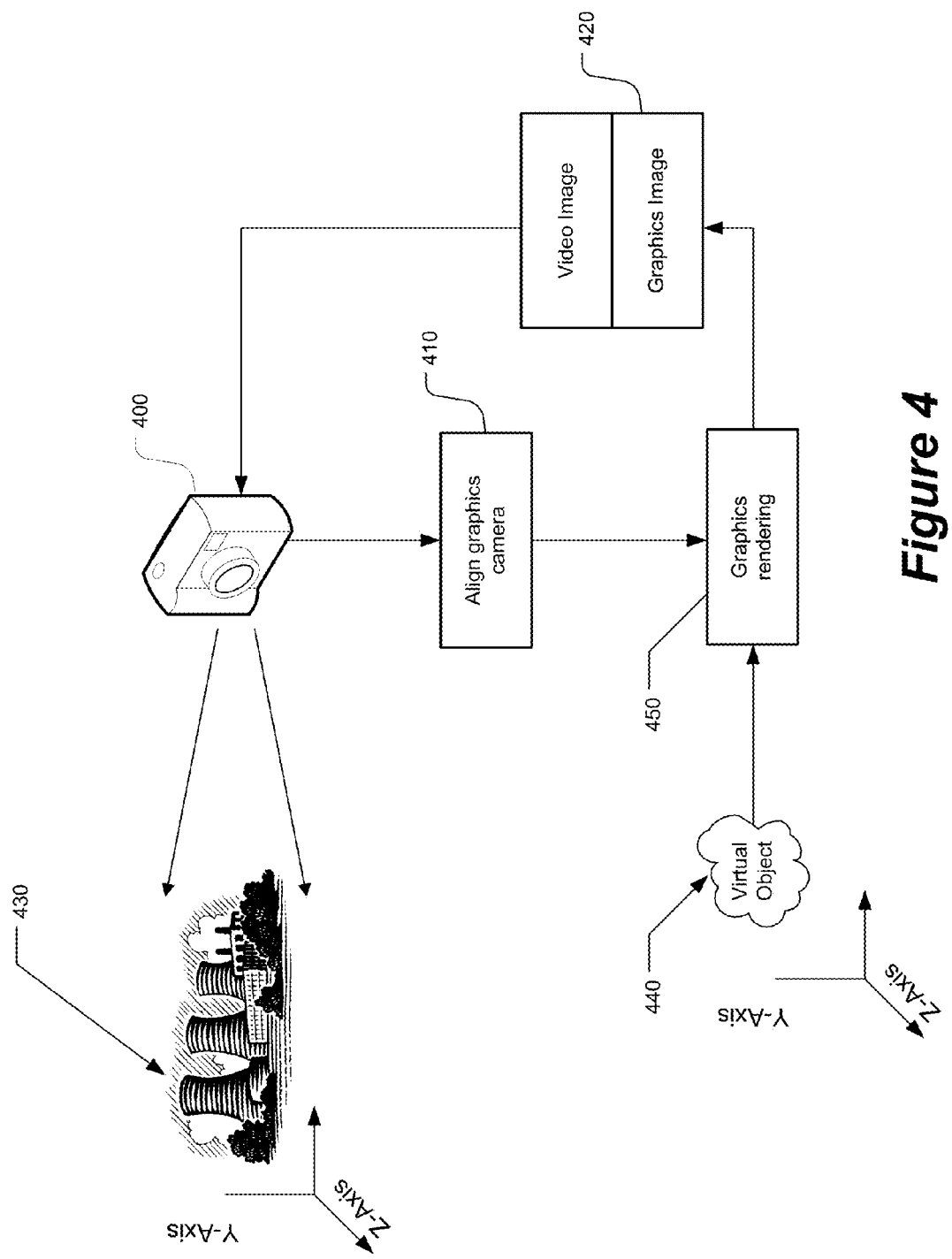
FIG. 4 illustrates a block diagram depicting one embodiment of an augmented reality system.

Referring to FIG. 3, an image 310 of a landmark may be captured and rendered on a display device 300. In an augmented reality system, a virtual object such as a text description 320 may be overlaid or merged with the image such that the real image and the generated portion may be combined in a single image and presented to the user. Referring to FIG. 4, a scene 430 may be viewed and captured by an imaging device such as a video camera 400. The scene 430 may be associated with a set of scene coordinates and aligned 410 accordingly. The camera may further perform a perspective projection of the 3D image onto a 2D image plane. The generation of the virtual image 440 may be performed with a standard computer graphics system 450. The virtual object 440 may be modeled in its own object reference frame. The graphics system 450 may further use information about the imaging of the real world scene so that the virtual objects can correctly rendered. This data may be used to control a synthetic camera for generating the image of the virtual objects. The generated image may then be merged with the image of the real scene to form the augmented reality image 420.

Augmented reality systems may operate in real-time so that a user may move about within the scene or area of interest and view a timely rendered augmented image. An augmented reality system may thus provide a sufficient update rate for generating the augmented image, such that the user may view an augmented image in which the virtual parts are rendered without any visible jumping or jerking. For example, the graphics subsystem may render the virtual scene at least 10 times per second in order to provide a smooth overall image. If there are delays in calculating the camera position or the correct alignment, then the augmented objects may tend to lag behind motions in the rendered image. In order for the virtual objects to appear realistically as part of the scene, photorealistic graphics rendering may be desirable. For example, the rendering may include fully lit, shaded and ray-traced images of the scenes. The system may use various means to ensure the accuracy of the associations between the real and virtual images. A proper association should be maintained while the user moves about within the real environment. Errors in this association may prevent the user from seeing the real and virtual images as seamless. In an embodiment, photorealistic graphics rendering to attain a seamless association between the real and virtual images may be implemented by processing the video stream such that the "real" images are brought closer in form to the virtual images. For example, a cell shading image processing algorithm may be applied to the camera images if the virtual content used for augmentation is of a cartoon or animated nature.

As noted, the system of FIG. 4 is exemplary and many system configurations may be used to implement the disclosed systems and methods. For example, display monitors may be used to provide a view of the augmented scene. To increase the sense of presence, a head-mounted display (HMD) may be used. Such HMDs may comprise video see-through and optical see-through systems.

In order to provide an augmented reality service, the service typically needs information to determine where the user or the image capture device is located in reference to his or her surroundings. Furthermore, the point of view of the capture device should be tracked. A tracking system may recognize movements and project the graphics related to the real-world environment the user is observing at any given moment. For example, the Global Positioning System (GPS) may be used to provide a location of the user. However, GPS receivers typically have an accuracy of about 10 to 30 meters and may not provide sufficient accuracy for augmented reality applications which may require accuracy measured in inches or less.

In order to provide augmented reality services for a captured image, the system may further be configured to recognize one or more items within the captured image. Object recognition is the task of finding and recognizing a given object in an image or video sequence. For an object in an image, there are a plurality of features on the object that can be extracted to provide a feature description of the object. Such feature descriptors extracted from an image can then be used to identify the object when attempting to locate the object in an image containing other objects. An image recognition algorithm may be used to extract feature descriptors and match the extracted features to recognize the image. It is desirable that such an algorithm be robust to changes in image scale, noise, illumination, local geometric distortion, and orientation/rotation. Feature descriptors may thus generally be defined as a point or part of interest in an image. A feature descriptor may be a distillation of a portion of an image, or an object in an image, to a set of definition data that can be referenced for identification purposes. Generally, a feature descriptor may be associated with recognition. The image areas for objects that may be referenced as the basis of descriptive features may be used for tracking purposes. In some cases this may consume more system resources that is desired. Alternatively, a different set of interest points on the objects that are not necessarily directed to identification may be used. Such interest points may be referred to as "tracking patches" or "landmarks" and may be used for location determination. Those skilled in the art will recognize that a specific definition of a feature descriptor will depend on the particular application and algorithm, and all such definitions are contemplated as within the scope of the present disclosure.

A feature descriptor may be part of an object in the field of view of an image capture system that appears in the rendered/captured image. Such a feature descriptor may be used as a point of reference or a measure. Feature descriptors may be also be placed into or on the imaging subject. Feature descriptors may act as reference points, and may further comprise fixed points or lines within an image to which other objects can be related or against which objects can be measured. The recognition of feature descriptors in images may act as a reference for image scaling, or may allow the image and a corresponding physical object to be correlated. By identifying feature descriptors at known locations in an image, the relative scale in the produced image may be determined by comparison of the locations of the markers in the image and subject. A device or system capable of recognizing feature descriptors may perform recognition by examining and processing individual pixels of an image and determining feature properties. Such analysis may further use knowledge databases and applications such as pattern recognition engines.

Figure 5A:
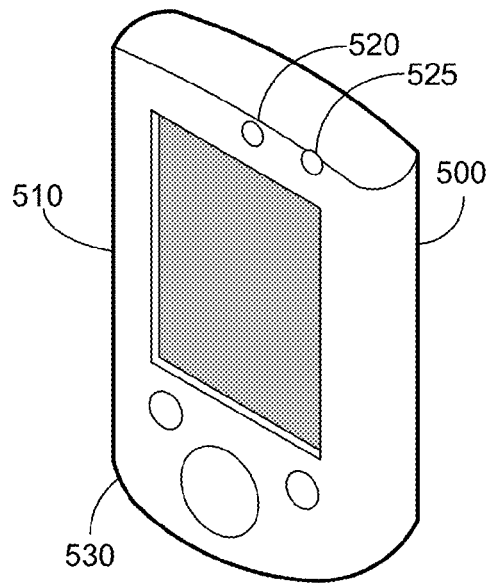
FIG. 5*a* is a graphical representation of one side of a device that may be used to implement parts of an augmented reality system.
Figure 5B:
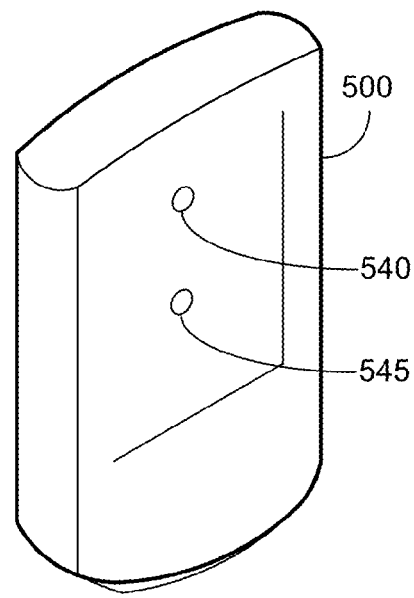
FIG. 5*b* is a graphical representation of another side of a device that may be used to implement parts of an augmented reality system.

A system for capturing and recognizing images may comprise one or more capture devices such as a digital or analog camera with suitable optics for acquiring images, a camera interface for digitizing images, input/output hardware or communication link, and a program for processing images and detecting features of the image. Referring to FIG. 5, an augmented reality system and/or related systems and methods may be implemented using a variety of devices and configurations. FIGS. 5a and 5b illustrate an exemplary, non-limiting device 500 that may be used in an augmented reality system. Device 500 may be any device capable of implementing the systems and/or methods disclosed herein, such as a dedicated video window device, a stereoscopic device, an augmented reality user interface device, or any other device dedicated to implementing an augmented reality system. Alternatively, device 500 may perform one or more aspects of an augmented reality system and work in conjunction with one or more other devices to implement a complete augmented reality system. Device 500 may also be integrated into one or more other devices that are capable of performing other activities beyond implementing an augmented reality system. Such devices may include a personal data assistant (PDA), a mobile telephone, a laptop or desktop computer, a mobile or stationary gaming system, a virtual reality helmet system, a stereoscopic eyewear, helmet or headgear, a camera, a video display simulating a window or a picture frame, a video or still image display configured to appear to be transparent, or any other device capable of implementing an augmented reality system and performing at least one other function. All such configurations and devices are contemplated as within the scope of the present disclosure.

FIG. 5a displays a user-facing side of device 500. On the user-facing side, device 500 may have a display 510 that may be any type of display capable of displaying video or still images. Display 510 may be a liquid crystal display (LCD), a cathode ray tube (CRT), a plasma display, a light-emitting diode (LED) display, an image projection device, or any other type of display or device capable of presenting an image visible to a user. Device 500 may also have more than one display. For example, device 500 may be a stereoscopic headgear with two displays, one for each eye, that create a three-dimensional effect when viewed. Multiple display configurations may be made up of multiple displays of the same type, or several different types of displays. Device 500 may be configured with various user controls 530, which may include buttons, dials, touch pads, keyboards, microphones, light or heat detection components, and any other type of user interface. All such configurations are contemplated as within the scope of the present disclosure.

Device 500 may be configured with user-facing detector 520 that may be any type of detection component capable of detecting the position of a user or a part of a user, or detecting a representation of user or a part of a user. In one embodiment, user-facing detector 520 may be a standard camera capable of capturing one or more still images or video images. In another embodiment, user-facing detector 520 may be a detection device capable of detecting a user or the position of a user or any part or representation of a user through the detection of heat, sound, light, other types of radiation, or any other detectable characteristics. Examples of such detectors include, but are not limited to, infrared detectors, thermal detectors, and sound/acoustic detectors. Device 500 may have more than one user-facing camera or detection device, such as secondary user-facing detector 525. A multiple detection device may be used to detect a user, part of a user, or a representation of a user or part of a user in three-dimensional space. Any number and type of detection devices configured on the user-facing side of a device that are configured to detect a user or one or more parts of a user, or a representation of a user or one or more parts of a user, are contemplated as within the scope of the present disclosure.

FIG. 5b illustrates the scene-facing side of device 500. One or more detectors, such as scene-facing detectors 540 and 545, may be configured on the scene-facing side of device 500. Scene-facing detectors 540 and 545 may be any type of detector or camera that is capable of capturing an image or detecting information about a physical space within its range, including the types of detectors and camera described in regard to user-facing detectors 520 and 525.

Device 500 may also be configured with computing and communications components not shown in FIGS. 5a and 5b. The various components that may be integrated into device 500 and/or an augmented reality system are described in more detail herein.

While device 500 as shown in FIGS. 5a and 5b has a single unit housing all the described components, the components and devices used in an augmented reality system may be physically separate. For example, user-facing detectors and scene-facing detectors may be physically separate from one or more displays and each other and located in separate housings. Moreover, other components, such as processors, memory, storage devices, etc. may be located in one or more physically distinct devices or components. Such devices or components may communicate with each other using communications technologies known in the art, including wired and wireless communications technologies. Furthermore, the scene facing camera may be a stereo setup (e.g., two cameras) which may allow for stereo rendering of augmented reality on the device. The scene facing camera may also be a 3D camera which can help capture feature descriptions. A 3D scene facing camera may allow for the collection of more granular/higher resolution depth over the captured video field which may serve to inform a proper occlusion of virtual objects by real ones in an augmented scene. All such implementations and configurations of an augmented reality system are contemplated as within the scope of the present disclosure.

Figure 6:
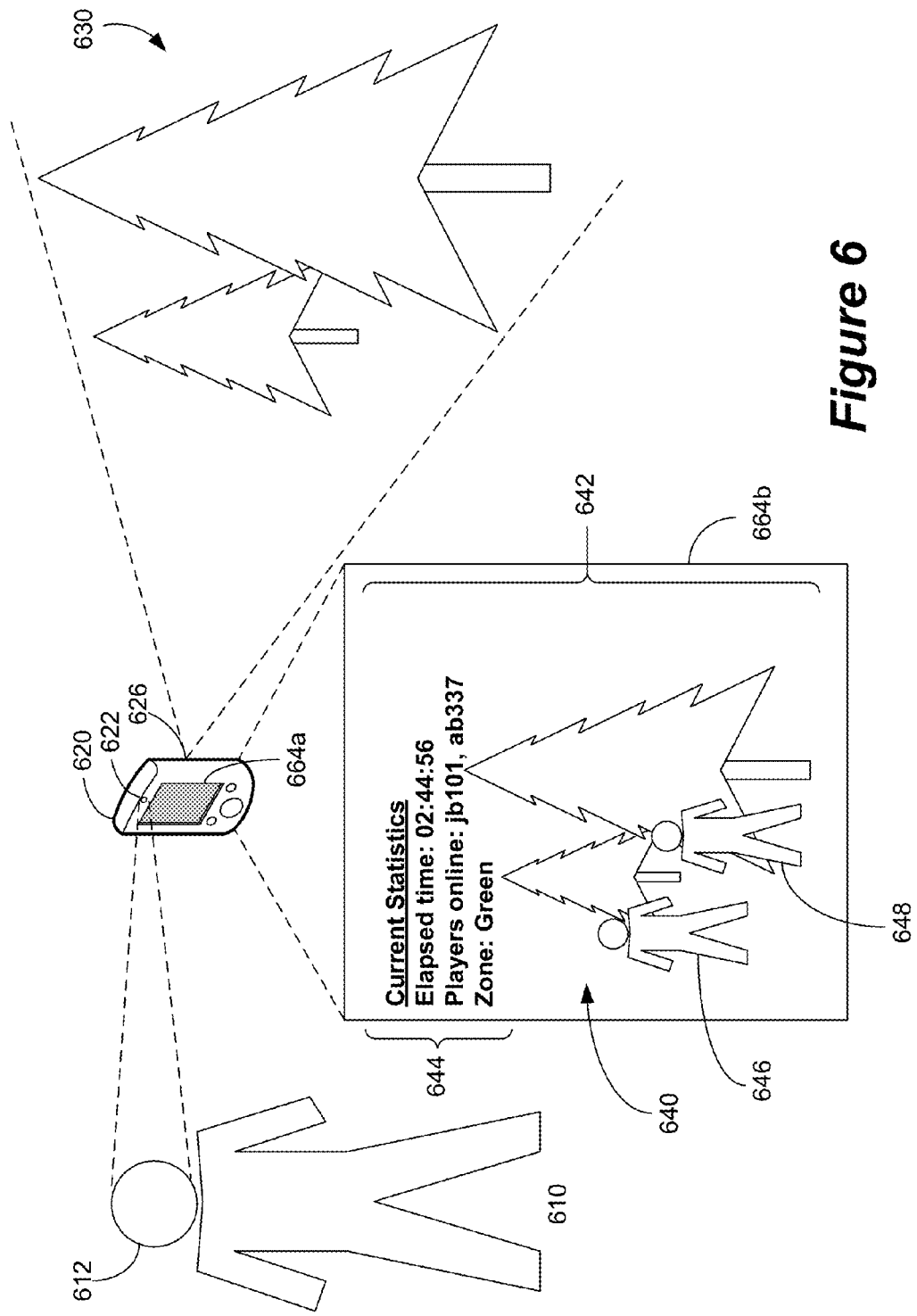
FIG. 6 is a graphical representation of an augmented reality system in use by a user proximate to a scene.

FIG. 6 illustrates the use of one embodiment of an augmented reality system. In FIG. 6, user 610 is operating device 620. Device 620 may be a device such as device 500 described in FIG. 5, or any other device or combination of devices and/or components capable of implementing one or more aspects of an augmented reality system. Device 620 may be configured with display 664a, user-facing detector 622, and scene-facing detector 626. Scene-facing detector 626 may be located on the back of device 620, and is not visible in FIG. 6 due to the positioning of device 620 in the figure. These components may be of any type, quantity, or configuration as described herein in regard to the various figures, or of any other type, quantity, or configuration.

User 610 may be operating device 620 proximate to scene 630. Scene 630 may be any physical space or area that scene-facing detector 626 is capable of detecting or from which scene-facing detector 626 may otherwise gather data. Device 620 may detect or capture data from scene 630, such as one or more video frame or still images. Device 620 may then process the image, including cropping and/or adjusting the image according to methods and means set forth herein. As part of the processing of the image, device 620 may augment the captured and/or processed image by compositing graphics, text, other images, or any other visual data on the captured image, and present the processed image to user 610 by rendering the processed image on display 664a.

Magnified display 664b shows how a processed image may appear to user 610 when displayed on display 664a. Display 664b contains processed image 640. Processed image 640 may include image 642 captured by scene-facing detector 626. Alternatively, processed image 640 may contain an image resulting from the cropping, magnification, or other alteration by device 620 of image 642 as captured by scene-facing detector 626.

Processed image 640 may also include elements such as persons 646 and 648, that may have been composited with image 642 to create processed image 640. Persons 646 and 648 may be participants in an activity with user 610, such as a game incorporating augmented reality, and may be physically present at an area remote to scene 630. Additional information may be added to processed image 640, such as information 644. Any other information, images, or other data may be added to an image taken by scene-facing detector 626. All such information, images, or other data may be generated by device 620, or received at device 620 through one or means of communications, such as wireless or wired computer network communications.

Processed image 640 may be cropped, magnified, or otherwise altered in some way based on the position or location of user 610 or some part of user 610, such as user's head 612. In one embodiment, user-facing detector 622 detects the location of user's head 612 and adjusts image 642 detected by scene-facing detector 626 to generate processed image 640. In another embodiment, user 610 may have affixed to the user or a part of the user a device that communicates location and/or position information to device 620. For example, user 610 may be wearing a helmet with communications components capable of transmitting messages to device 610 and components configured to detect or determine user 610's position or location. All such means of determining a user's position or location are contemplated, and examples of such means will be discussed in more detail herein.

The location of a user or a part of a user, such as the user's head or the user's eyes, may be determined using any effective method. Positioning of a user in the context of a dynamic perspective video window may be a function of determining the location of the scene facing detector in space relative to observed landmarks, the location of the display relative to the scene facing detector (typically a fixed constant), the location of the user facing detector relative to the display (typically also fixed), and finally the location of the user's eyes relative to the user facing detector. Such methods may include traditional or three-dimensional facial recognition and tracking, skin texture analysis, and/or software algorithms designed to detect the position of a user or part(s) of a user from an image or other detected information, including a representation of a user rather than an actual user. Alternatively, a user may have affixed upon the user light-emitting glasses, detectable tags, or other implements that allow the detection of the user or one or more parts of the user. For example, the user may have adhesive dots attached to the user's head near the eyes that are detectable by a specific form of detector, such as a detector configured to detect a specific form of radiation emitted by the adhesive dots. The detection of these dots may be used to determine the location of the user's eyes. Other methods may be used instead, or in conjunction with, these methods. Any method or means capable of providing data that may be used to determine the location, proximity, or any other characteristic of a user or a user's location is contemplated as within the scope of the present disclosure.

Alternatively, the location of a user or parts of a user may be determined based on the physical location of the display(s), such as display 664a/b and display 510. In one embodiment, an augmented reality system may be implemented in a helmet, headgear, or eyewear. The location of the user's eyes may be determined by assuming that the user's eyes are proximate to the display(s) that are set into the area in the helmet, headgear, or eyewear that would normally be proximate to the eyes when the helmet, headgear, or eyewear is affixed to or worn by a user. For example, in an augmented reality system implemented in eyewear with displays set into or proximate to where eyeglass lenses would normally be situated, the system may assume that the user's eyes are just behind the displays. Similarly, in a helmet-implemented system, the system may assume that the user's eyes are proximate to an eye-covering portion of the helmet. Other configurations and implementations that determine eye locations or the locations of other parts of a user based on the location of a part of the system assumed to be proximate to the user or a part of the user are contemplated as within the scope of the present disclosure.

As mentioned, in some embodiments, all of the functions may reside in a user device such as a portable camera or a smartphone. In other embodiments, the image may be captured by a user device with a suitable capture device, and transmitted over a network to another system that may provide, for example, an image processing service for analysis and pattern recognition. The image may first be manipulated to reduce noise or to convert multiple shades of gray to a simple combination of black and white. Following such initial processes, the system may count, measure, and/or identify objects, dimensions, defects or other features in the image. A number of image processing techniques may be used such as pixel counting, thresholding, segmentation, inspecting an image for discrete groups of connected pixels as image landmarks, edge detection, and template matching. A system may use a combination of these techniques to perform an image recognition process.

In one embodiment, feature descriptors may be used for the purpose of object detection based on a captured and/or transmitted image. Various methods known to those skilled in the art may be used to implement forms of feature descriptors. For example, occurrences of gradient orientation in localized portions of an image may be counted. Alternatively and optionally, edge detection algorithms may be used to identify points in an image at which the image brightness changes sharply or has discontinuities.

In an embodiment, feature descriptors may be used such that image detection may be based on the appearance of the object at particular interest points, and may be invariant to image scale and rotation. The descriptors may also be resilient to changes in illumination, noise, and minor changes in viewpoint. In addition, it may be desirable that feature descriptors are distinctive, easy to extract, allow for correct object identification with low probability of mismatch, and are easy to match against a database of feature descriptors. In some embodiments, object recognition may be performed real time or near real time.

A combination of augmented reality and mobile computing technology may be used on mobile devices such as mobile phones. Furthermore, because of the limited processing and available memory on such devices, it may be advantageous for the device to transmit one or more captured images via an accessible data network to a system available via the network. For example, a server may provide image analysis and recognition services for image data transmitted by the mobile device. The server may also access a database storing augmented reality data that may be transmitted to the mobile device. Furthermore, the server, in addition to maintaining a database storing augmented reality data for transmission, may also maintain a database storing detailed cartography information for recognized scenes. Map databases may store precise location information about observed physical landmarks in various regions. Such information may be maintained and transmitted to mobile devices so that they might then track their location against the provided map. Computationally, it is typically costly to construct such maps dynamically (i.e., building a refined map of a device's recorded surroundings on first observation). Thus in various embodiments, mobile devices may be enabled to capture information about detected physical areas (e.g., interest point landmarks and their composition) and determine accurate three dimensional locations of landmarks on either the mobile device or the server. The locations may be maintained in a persistent map database and the map may be made available to other mobile devices that later enter the area such that the devices need not recalculate the locations of observed scenes. At a minimum, the devices may need only make evolutionary updates to the map. Shared map information may thus provide a plurality of services for augmented reality computing.

The mobile device may include a location determination function, such as GPS or cellular based location determination. In an embodiment, the location determination performed by the device may be transmitted to a server. The device's location may be determined hierarchically, for example beginning with a coarse location estimate and refining the initial estimate to arrive at a more precise estimate. In one embodiment, the server may perform refined location determination based on an analysis of the transmitted image. By taking into account the transmitted location, the server may narrow the search for a refined location. For example, if the transmitted location estimate indicates that the device is near a downtown city area with a radius of 1000 meters, the server may focus further search inquiries to information within the estimated area. The server may include or access a database of image information and feature descriptors, and may perform database queries driven by location, tracking, and orientation data as determined from an analysis of the transmitted image information. For example, an analysis of an image of a landmark may result in the extraction of feature descriptors that may uniquely distinguish the landmark. The server may perform a database query for similar feature descriptors. The returned query may indicate the identity of the landmark captured in the image. Furthermore, the server may determine that the image was captured at a particular orientation with respect to the landmark.

Once the device location and orientation is determined, a number of useful features and services may be provided to the device. In one embodiment, targeted advertisements that may be relevant to the location and local environment may be downloaded to the device, whereupon the advertisements may be merged with the currently presented image and displayed on the device. For example, the database may include advertisement data associated with geographic pointers and/or particular businesses. The data may be associated with feature descriptors that are associated with particular locations and businesses.

It can be further appreciated that once a device's location and orientation or point of view is determined, any number of services may be provided related to the location and orientation. For example, real time or near real time queries may be generated or prompted upon direct input from the user. In an embodiment, when a user clicks on a portion of a rendered image on the mobile device, the augmented reality system may interpret the user click as a request for additional information about the item or landmark represented by the selected portion of the rendered image. For example, the user may click on the portion of the image in which a particular business is rendered. Such navigable areas may be rendered similar to a web page on a browser. In other embodiments, the user input may represent a push/pull for information regarding the area associated with the user input. Rendering of the received information from the database may be performed through a variety of methods such as a 2D overlay, 3D augmented reality, playback of a particular sound, and the like.

In addition to providing metadata as described in the above examples, context specific actions may also be delivered to a device. In one embodiment, a device may receive a request to provide the database with a particular piece of information when a particular landmark or location is determined to be in view. For example, during the context of a shared game, the player's current health may be requested when triggered by a particular landmark that comes into view. The player health information may then be transmitted to other players cooperating in a shared gaming experience.

In some embodiments, the database may comprise predetermined data such as feature descriptors and metadata associated with one or more landmarks. The predetermined data may be provided by the service provider. Additionally and optionally, the data may be user defined and transmitted by users. For example, landmarks that are not represented by pre-populated feature descriptors in the database may be represented by images provided by users. The term landmark may comprise any recognizable feature in an image, such as a textured portion of any object. For example, the blade of a windmill and the letter 'G' of an artist's signature in a wall painting might be two of the detected landmarks in the captured image of a room scene.

When a pattern fails to be recognized by the image recognition engines, it may be determined that the pattern represents a new landmark and the user transmitted image may be used to represent the new landmark. In an embodiment, a user may decide that they desire to augment some space with content of their own choosing. For example, a user may enter an unknown area, collect information about the area such as feature descriptors, map data, and the like, and register the information in a database such that other users entering the area may then recognize the area and their place within the area. Additionally and optionally, the user or an application may choose to associate their own augmentation metadata with the area (e.g., placing virtual graffiti in the space) and make such data available to other users who may observe the area at the same or a different time. Multiple users may associate different metadata with a single area and allow the data to be accessible to different subsets of users. For example, a user may anchor some specific virtual content representing a small statue in a tavern, which may then be made visible to the user's on-line video game group when they enter the tavern while the virtual content may not be seen by any other mobile users in other video game groups. In another example, another user may have augmented the tavern with animated dancing animals. By enabling such augmentation and data sharing, the members of any type of gaming, social, or other type of group may share in the same set of common information about the tavern, its landmark descriptors, and their locations. At the same time, all users may not necessarily share in the same metadata associated with the venue.

In an embodiment, metadata such as device location may be automatically and seamlessly transmitted by the user device to supplement to the newly added landmark. Additionally and optionally, users may be prompted to provide additional information that is associated with the newly created entry.

Furthermore, users may provide additional context sensitive metadata associated with a particular landmark. For example, a landmark may contain different sets of metadata that may be dependent upon the user's context (a building may access different metadata when viewed within a particular game application, as compared to when viewed from a travel guide application).

Figure 7:
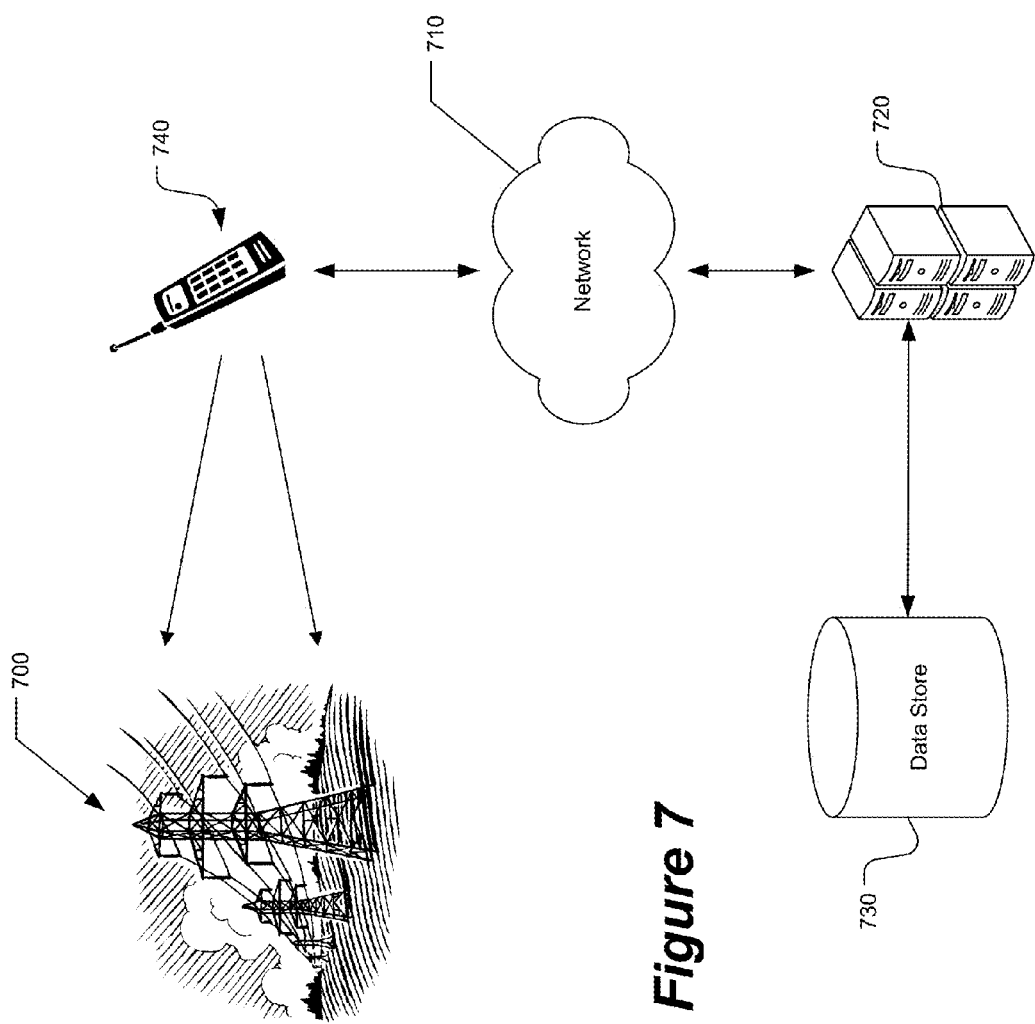
FIG. 7 illustrates a block diagram depicting one embodiment of an augmented reality system.

In one exemplary embodiment illustrated in FIG. 7, a device with an image capture capability 740 may capture an image of a landmark 700. The captured image file may be transmitted via a network 710 to system 720 that may comprise one or more servers hosting at least one application that receives the transmitted image and analyzes the image to extract feature descriptors. Device 740 may further include a location determination capability using GPS or other location determination means, and may transmit the location information along with the image data. System 720 may further have access to data store 730 that may comprise a database of predetermined landmarks associated with a number of feature descriptors. System 720 may query the data store 730 for a matching landmark based on the feature descriptors extracted from the image transmitted by device 740. If a match is found, data store 730 may further return metadata associated with a matched landmark. System 730 may then transmitted the returned metadata to device 740 via network 710, whereupon the device 740 may render the received metadata and/or merge the received metadata with a currently rendered image.

Those skilled in the art will readily recognize that each particular processing component may be distributed and executed by the user device and servers and other components in the network. For example, metadata extraction and landmark recognition can be handled by the device or by the server (having been supplied with the relevant sensor information).

Augmented Reality Filtering with Inertial Sensors

The rendering of computer generated objects together with or merged with real time images typically requires that the pose, location and orientation of the camera or other device performing the image capture be accurately tracked over time. When the image capture is not accurately tracked, the seamless merging of the augmented objects with objects in the real world may be lost. For example, the augmented reality algorithms may process real time images to determine the location and orientation of stationary features in the augmented scene and determine the cameras pose with respect to those features. The computed orientation and location information may allow the computer generated objects to be properly placed within the image. However, several issues may arise when such information is used for such placement without additional and external information. First, noise in the location and orientation estimates generated by the algorithms may cause undesired effects in the displayed image. For example, the augmented objects may jump and jitter in a random fashion and otherwise may not remain in the expected location in relation to the real world objects. Second, the algorithms may consume significant resources to properly and continuously track the location and orientation of the camera with respect to stationary objects in the real scene.

In various embodiments disclosed herein, measurements may be received from one or more inertial sensors attached or included in the mobile device. Such inertial sensors may comprise any type of device that senses local motion such as the type, rate, and direction of the motion. Inertial sensors may comprise accelerometers and/or gyroscopes or similar devices. The sensors may detect the device's rate of acceleration and/or changes in rotational attributes, including pitch, roll and yaw, which may then be used to calculate the device's speed and position given a known initial speed and position. Thus, using such sensors a mobile device may detect a change in its geographic position, a change in its velocity, and a change in its orientation by measuring the linear and angular accelerations applied to the device. In one embodiment, three accelerometers and three gyroscopes may be used. Furthermore, the accelerometers may be placed such that their measuring axes are orthogonal to each other. Similarly, the gyroscopes may be placed in an orthogonal pattern in order to measure rotational position in reference to a selected coordinate system.

The measurements may be merged using an appropriate algorithm with absolute pose estimates obtained from augmented reality algorithms executing with real time images.

By merging the data, the device may more quickly obtain higher accuracy orientation estimates for the device with respect to an object known to be stationary in the environment, as compared to strictly using one type of data.

As described above, when a user views a particular object or landmark on a device with image capture capability, information may be presented through rendering means such as a traditional web browser, rendered as a 2D overlay on top of the live image, and rendered in augmented reality into the physical environment. In one embodiment, the rendered image may be generated by merging data from the camera and the inertial sensors such as angular rate gyros and accelerometers to more accurately place augmented reality objects in the rendered video. Furthermore, the complexity and expense of augmented reality algorithms may be reduced, in particular if the algorithms cannot process frames at the full frame rate of the camera or there is too much latency induced by the algorithm. In this case, the data from the inertial sensors can be used between processed frames to more accurately interpolate the pose of the device in real time. In some embodiments, augmented reality algorithms may be modified to enable faster tracking of a region of interest for camera images by utilizing motion measurements obtained from inertial sensors. By utilizing the measurements, the algorithm may not have to search all of the pixels in an image for previously recognized features from previous frames since the measurements from inertial sensors provide an indication of their location in the current frame.

In an embodiment, inertial sensor data may be used if the image processing algorithm fails and optical tracking is lost over multiple frames. This may occur, for example, under conditions of image blur during rapid device movement. In such a case, the inertial sensor data may be used to maintain updated device pose estimates throughout the period of the blur and preserve the anchoring of rendered augmentation constructs. Tracking may then resume when the captured image quality is restored. Additionally, in cases where optical tracking is completely lost and the tracking algorithm is not able to successfully resume to produce an updated pose, sensor-based pose updates may aid a tracking recovery function.

Figure 8:
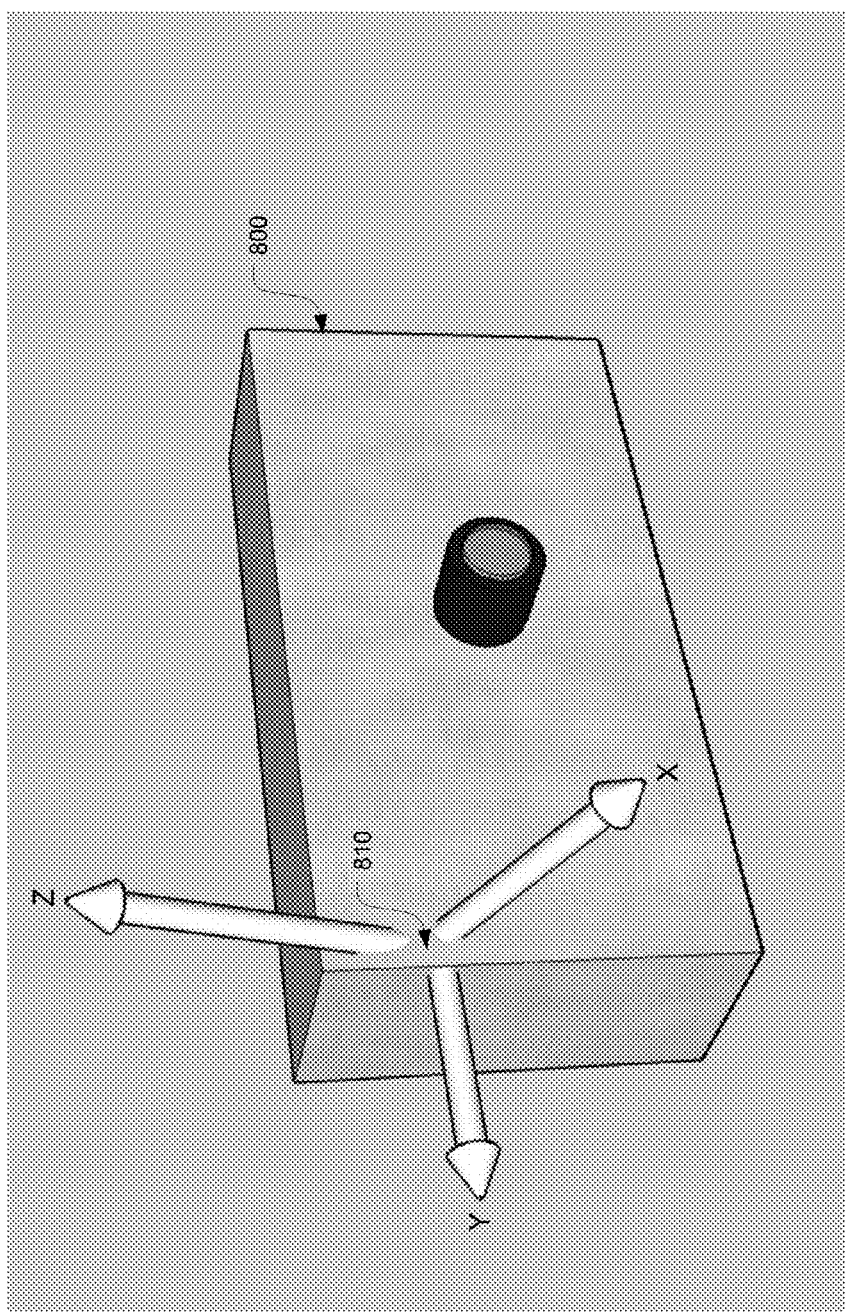
FIG. 8 is a graphical representation of an image capture device and a triaxial orientation.

In an embodiment, improvements in three dimensional positioning may be obtained by adding triaxial accelerometers and/or gyros to the device in addition to the imaging sensor. The triaxial gyros may be mounted such that each axis is mutually orthogonal to the selected reference axes. A similar mounting may be utilized for triaxial accelerometers such that both angular rate and acceleration may be detected in three dimensions. In one embodiment, the accelerometers may be mounted such that no single axis is likely to be parallel to the gravity vector in typical usage patterns. If the z axis accelerometer does not point directly down the primary imaging axis, differences may be accounted for mathematically before the measurements are used with the imaging data. By mounting the accelerometers such that no single axis is likely to be parallel to the gravity vector, the likelihood for erroneous measurements due to the gravity vector may be reduced. For example, when an axis is parallel to the gravity vector, the corresponding accelerometer may read 1 g, while the other two that are perpendicular to the gravity vector may read 0 g. This may mean that some changes in orientation may not be detected since these accelerometer readings may not change as the device is rotated about the axis that is parallel to the gravity vector. FIG. 8 illustrates one example of such a mounting. Device 800 may be any type of image capture device or environmental capture device. The device 800 may include a triaxial accelerometer apparatus configured to capture acceleration data in three orthogonal axes. The orientation of the three orthogonally situated accelerometers may be indicated by reference axes 810. As shown, the z axis is situated such that the z axis is not perpendicular to the x-y plane when the device 800 is substantially upright with respect to the horizontal plane.

The following is an exemplary method for combining data taken from triaxial gyros and triaxial accelerometers with the location and orientation estimates obtained from the processing of image data. In the following examples, the term computer vision algorithm may be used to describe any algorithm that estimates the location of one or more objects based on the captured image of one or more objects. In one embodiment, the inertial sensors may include both rate gyros and accelerometers. The sensors may be sampled in each of the axes at a rate which matches or exceeds the camera capture frame rate. For example, the camera capture rate may occur at a rate of thirty Hertz (30 Hz) or sixty Hertz (60 Hz). Such inertial sensors can typically be sampled at rates of one hundred Hertz (100 Hz) or higher.

The delta position and orientation estimates may be updated by applying the current inertial sensor readings. Sensors such as inertial measurement sensors may include a measurement bias or bias error. The inertial sensor readings may be adjusted or corrected by removing the bias estimate calculated by a filter when the last image was processed. In some embodiments, a filter such as a Kalman filter may be used to estimate the state of the system in the presence of noisy measurements.

If the computer vision algorithm is still processing an image, then the current uncorrected inertial sensor readings may be added to a list of measurements for subsequent use when the accumulated readings are re-synchronized after the computer vision algorithm completes the estimates and provides new filtered position, orientation and inertial sensor bias estimates. The absolute position and orientation estimates obtained from the last processed image may be updated by integrating the corrected inertial sensor readings.

If the computer vision algorithm has just completed processing of an image, then the estimate provided by the algorithm may represent an absolute estimate of the device's position and orientation in three dimensional (3D) space as determined from the computer vision algorithm and delta position and orientation estimates accumulated from the accelerometers and gyros since the last camera image was processed. This data may then be input to a filter to obtain an updated estimate of the absolute position and orientation. The filter may be configured to provide not only filtered absolute position and orientation estimates, but also to provide estimates of the amount of bias in each of the inertial sensors (i.e. constant drift value for each gyro.) These bias estimates can then be used between processed camera images to reduce the bias error while using the intermediate inertial sensor readings to interpolate the pose of the camera.

As mentioned, the system may also have a list of inertial sensor readings that were captured since the image processing began for this frame. Based on the contents of this list, the inertial sensor readings may be accumulated to calculate an updated estimate for the relative and absolute position and orientation estimates based on the new values for camera pose and inertial sensor bias that were just calculated by the filter.

The list of inertial sensor readings used subsequently for re-synchronizing the position and orientation estimates may then be cleared. Furthermore, the relative position and orientation variables used to track the amount of rotation and translation that takes place between processed images may also be cleared. If there is a new image from the camera available to process and an image is not currently being processed by the computer vision algorithm, then the computer vision algorithm may be initiated with the new image data while providing the delta position and orientation estimates since the last frame was processed. Since the estimates were calculated from the received inertial sensor readings and processed after the last frame was received, the delta position and orientation estimates can be used by the computer vision algorithm to improve or optimize its search pattern.

In one embodiment, the alternatives that the algorithm would normally consider as part of its search may be reduced since some search alternatives may conflict with the delta estimates. In another embodiment, the delta rotation and translation estimates may be used to predict where currently tracked features would have moved so that a search for the feature descriptors can first focus in the predicted portion of the frame rather than the entire frame.

If there is a new frame from the camera into which computer generated objects should be placed, then the latest accumulated absolute position and orientation estimates obtained from the integration of the intermediate inertial sensor readings since the last image was processed may be used to position computer generated objects into the current image.

Figure 9:
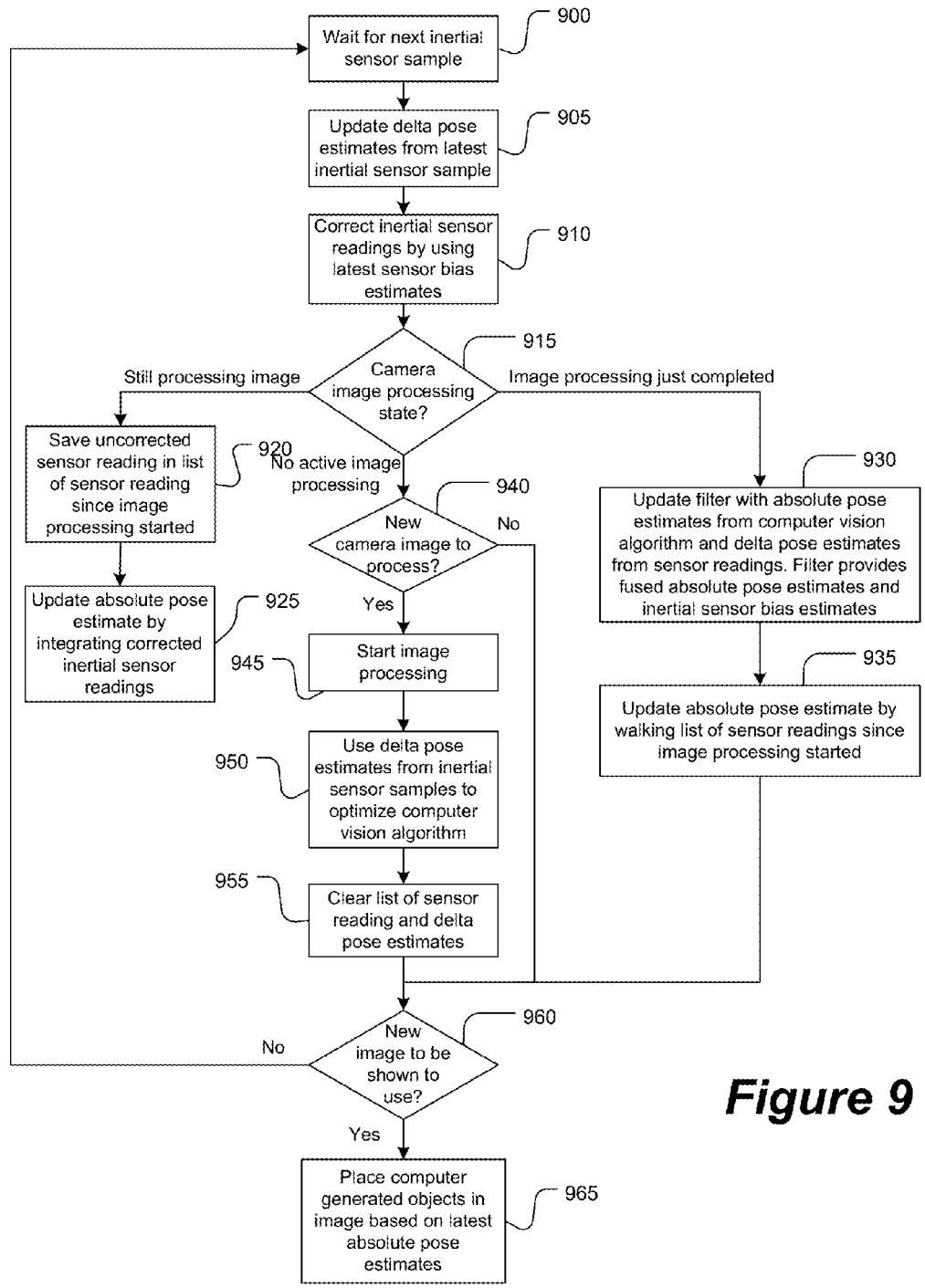
FIG. 9 illustrates an example of an operational procedure for augmenting location based data using inertial sensor information.

Referring to FIG. 9, illustrated is an example operational procedure for computer based visioning with inertial sensors. Operation 900 illustrates waiting for and receiving the next inertial sensor sample. For example, the inertial sensors may be sampled at a selected rate. Typically, each of the axes may be sampled at a rate which matches or exceeds the camera capture frame rate. In operation 905, the delta position and orientation estimates may be updated by applying the received inertial sensor samples. In various embodiments, the updating may be performed using a variety of techniques for integrating position and orientation estimates from multiple sources. For example, a position and velocity may be estimated by integrating information received from the inertial sensors. Using this information a new location may estimated. The location estimate may be combined with the location estimate determined by the computing vision algorithm using an appropriate filter or other means. For example, Kalman filtering may be used to combine the estimates such that any errors in position and velocity are stabilized.

Operation 910 illustrates that the inertial sensor readings may be corrected using the latest sensor bias estimates. As mentioned, in the absence of external corrections, small errors in the measurement of acceleration and angular velocity may be integrated into progressively larger errors in velocity and thus errors in position. By using the latest bias estimates calculated by the filter when the last image was processed, such bias errors may be reduced or removed.

Subsequent processing may be determined by the status of the computer vision processing of the most recent image as shown in operation 915. Beginning with operation 920, illustrated is an example process when the computer vision algorithm is still processing an image. At this point, a previous pose estimate is available, while a current pose estimate is still in process. Operation 920 illustrates that the uncorrected sensor readings may be saved to a list for later use. For example, the readings may be saved in a buffer or other memory. The saved readings may then be accessed after the computer vision algorithm completes and provides new filtered position, orientation and inertial sensor bias estimates. Operation 925 illustrates that the absolute pose estimate may be updated by integrating the corrected inertial sensor readings with the position and orientation estimates obtained from the last processed image.

Beginning with operation 930, illustrated is an example process when the computer vision algorithm has just completed processing of an image. Once the computer vision algorithm completes, an absolute estimate of the device's position and orientation in three dimensional (3D) space may be available. Furthermore, the delta position and orientation estimates accumulated from the accelerometers and gyros since the last camera image was processed may also be available. In operation 930, this data may be input to the filter (e.g., Kalman filter) to combine the data and obtain estimates of the absolute position and orientation. The filter may be configured to provide filtered absolute position and orientation estimates as outputs. Furthermore, the filter can be configured to provide estimates of the amount of bias in each of the inertial sensors. These bias estimates may be used between processed camera images to reduce the error while using the intermediate inertial sensor readings to interpolate the pose of the camera.

Furthermore, the list of inertial sensor readings that were captured since the image processing began for this frame may be available, as provided for in operation 920. Operation 935 illustrates updating the absolute pose estimate as a function of the list of inertial sensor readings. By analyzing one or more entries in this list, correcting the recorded inertial sensor readings with the latest bias estimates, and accumulating these correct inertial sensor readings, an updated estimate for the relative and absolute position and orientation estimates may be determined based on the new values that were just calculated by the filters for camera pose and inertial sensor bias.

Beginning with operation 940, illustrated is an example process when a new image from the camera is available to process and an image is not currently being processed by the computer vision algorithm. Operation 940 illustrates determining that a new camera image is available to process. Operation 945 illustrates starting the computer vision algorithm on the new image data. Operation 950 illustrates that while processing the new image data, the delta position and orientation estimates since the last frame was processed may be provided. The delta position and orientation estimates were calculated from the inertial sensor readings that were received and processed since the last frame was received. The delta position and orientation estimates may be used by the computer vision algorithm to improve or optimize its search. In one embodiment, the alternatives that the algorithm would normally consider as part of its search may be reduced since some potential fields may conflict with the delta estimates. For example, if the sensor data indicates that the camera has not changed orientation, then the computer vision algorithm does not need to consider locations outside of the current field of view. In another embodiment, the delta rotation and translation estimates may be used to predict where currently tracked features would have moved so that searching for these features in the new image can be first checked in the predicted portion of the frame rather than the entire frame. For example, if the inertial sensors indicate linear movement and a change in orientation, then a new camera location and position may be estimated. Because inertial sensor outputs may be received within a short period of time, the new location estimate may be calculated and used to estimate a new location of an object of interest, thus narrowing the portion of an image file that must be searched. Operation 955 illustrates clearing the list of inertial sensor readings and pending relative position and orientation variables.

In operation 960, it is determined whether there is a new frame from the camera into which computer generated objects should be placed to form an augmented reality image.

If there is a new frame, then operation 965 illustrates using the latest accumulated absolute position and orientation estimates obtained from the integration of the intermediate inertial sensor readings since the last image was processed to place computer generated objects into the current image.

Figure 10:
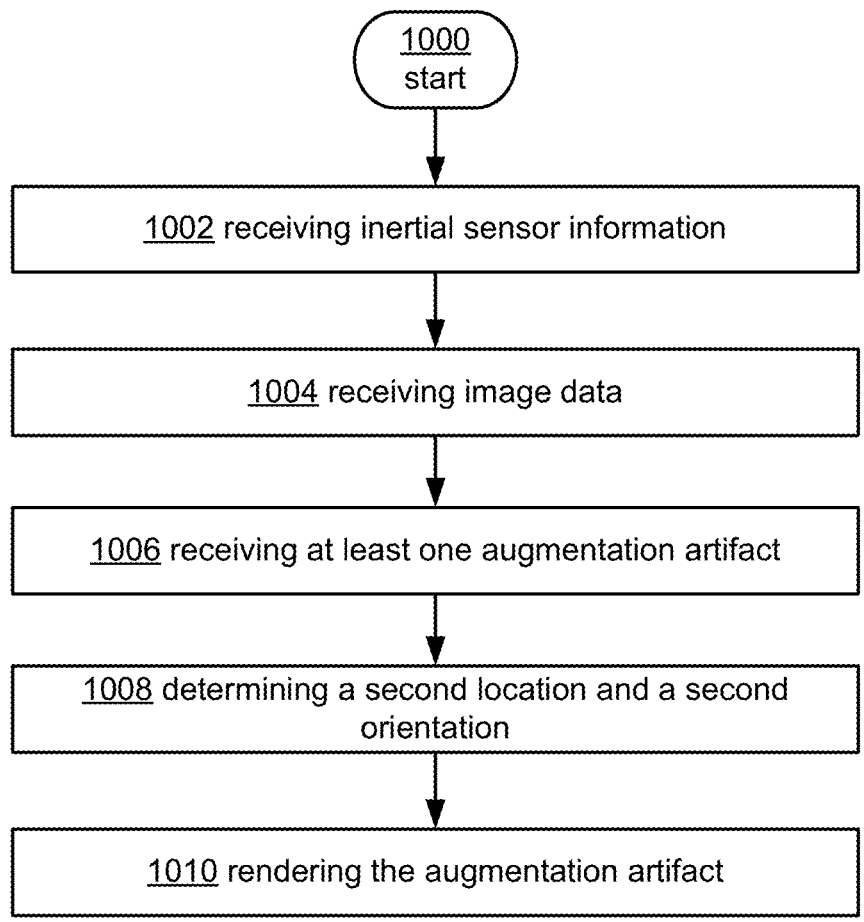
FIG. 10 illustrates an example of an operational procedure for augmenting location based data.

FIG. 10 depicts an exemplary operational procedure for augmenting location based data including operations 1000, 1002, 1004, 1006, 1008, and 1010. The illustrated operations are exemplary and do not imply a particular order. Referring to FIG. 10, operation 1000 begins the operational procedure and operation 1002 illustrates receiving inertial sensor information indicating a relative movement of an image capture device. Typically the image will be captured by a capture device on the mobile unit, such as a camera. The image data may comprise a single image, a series of images, or a video stream. Operation 1004 illustrates receiving from the image capture device at least one set of image data representative of at least one object in a vicinity of a first location and a first orientation for said image capture device, the first location and first orientation determined as a function of at least one geographically invariant point determined from said image data.

Operation 1006 illustrates receiving at least one augmentation artifact comprising a media entity associated with said first location and said first orientation. The artifact may be a media entity such as an image file, audio file, and the like. Furthermore, the location estimate may be determined as a function of at least one geographically invariant point determined from the image data. As described above, the image data may be analyzed to determine one or more feature descriptors that uniquely identify the landmark or object included in the image data. The first location estimate may be used to provide an initial estimation of the landmark or object and narrow the search. In an embodiment, the magnitude of the initial search radius may be determined by an information source. For example, if the information source provides an initial estimate determined using GPS, the search radius may be ten to thirty meters. If the first location estimate was determined using cellular based techniques, the search radius may be hundreds or thousands of meters.

Operation 1008 illustrates determining a second location and a second orientation of said image capture device, the second location and second orientation determined as a function of said inertial sensor information and said first location and said first orientation. Operation 1010 illustrates rendering the at least one augmentation artifact on the display. The artifact may include metadata that describes the type of data included in the artifact and how the artifact may be rendered. For example, if the artifact is an image file, the metadata may describe the location within the image where the artifact should be rendered. For example, the metadata may indicate using a two dimensional grid the location of the center point of the artifact. Alternatively, the metadata may indicate the rendering location with reference to the identified landmark or object within the image. Optionally the device may utilize the metadata to determine the location of the received artifact. In an embodiment, a map associated with a given region may define a coordinate system for the area. The position of the camera/device may be expressed in that coordinate system and the metadata of an artifact to be rendered may comprise the position and orientation of the artifact in that coordinate system (e.g., via a matrix transform).

The augmentation artifact may be user defined in some embodiments. User defined augmentation artifacts may be created by users and transmitted to a data store. In some cases a landmark or object within an image file may not be recognized or may be recognized but no artifacts may currently be available for the landmark or object. In some embodiments a service provider may populate a database with predefined artifacts. The artifacts may be periodically updated by the service provider. The updates may include artifacts for new businesses and other points of interests. In some embodiments a service provider may accept advertisement-like artifacts for a fee or on a subscription basis.

Additionally and optionally, a database may include artifacts defined and submitted by users. Such artifacts may include images and other media types that are captured or created by users. For example, users may generate text notes, image files, or audio files. Another example of user generated artifacts are fully animated three dimensional constructs. The user generated artifacts may be associated with a particular landmark or geographic feature. The association may be established using an appropriate application on the user device. In some embodiments the association may be made automatically based on the user context. For example, the user may identify a portion of a currently rendered image and activate the device by clicking or other appropriate means, and the application may launch a context sensitive menu that allows the user to create an artifact. Alternatively, the user may navigate to an existing file on the device to associate with the selected portion of the image. The artifact may then be uploaded via an available network. In some embodiments, the artifacts may not be associated with a specific landmark or geographic feature but may instead be anchored in a discrete position relative to all landmarks/features distributed throughout an area (e.g., the coordinate system).

In other embodiments, the location information (such as audio, feature descriptors, GPS coordinates, and the like) maintained in the database may also be added and updated by the users. For example, the first person using the system around a particular landmark such as a dam may upload GPS coordinates, feature descriptors, and other data associated with the dam. The user may further add a 3D animation of water flowing over the dam. This user defined location information and augmentation data may then uploaded and stored in the database for other users. In another example, the user accessible database may include location data applicable to a scene during the day but not at night. In this case, the user may upload feature descriptors for the scene that are applicable at night for use by other users.

Because the geographic location information is also stored in the database, when the user sends their location data to the system, the system may determine their location by matching the received information with the stored information related to the user's location. This may allow, for example, a shared experience between devices that may require that their locations be synchronized to a specified accuracy. In another example, it may be possible to avoid a user location data capture phase since the user only needs to capture a subset of the possible location data. The subset of data may be uploaded to the system which may match the received subset with a larger set of data in the database store for the user's location. The system may then send the rest of the location information to the user's device.

Access to user created artifacts may further be defined by the user and included in metadata transmitted along with the artifact. Some artifacts may be generally accessible to other users. Other artifacts may be accessible to identified users or users within an identified group via social networking or other services. Furthermore, artifacts may be associated with specific applications such as game applications.

Figure 11:
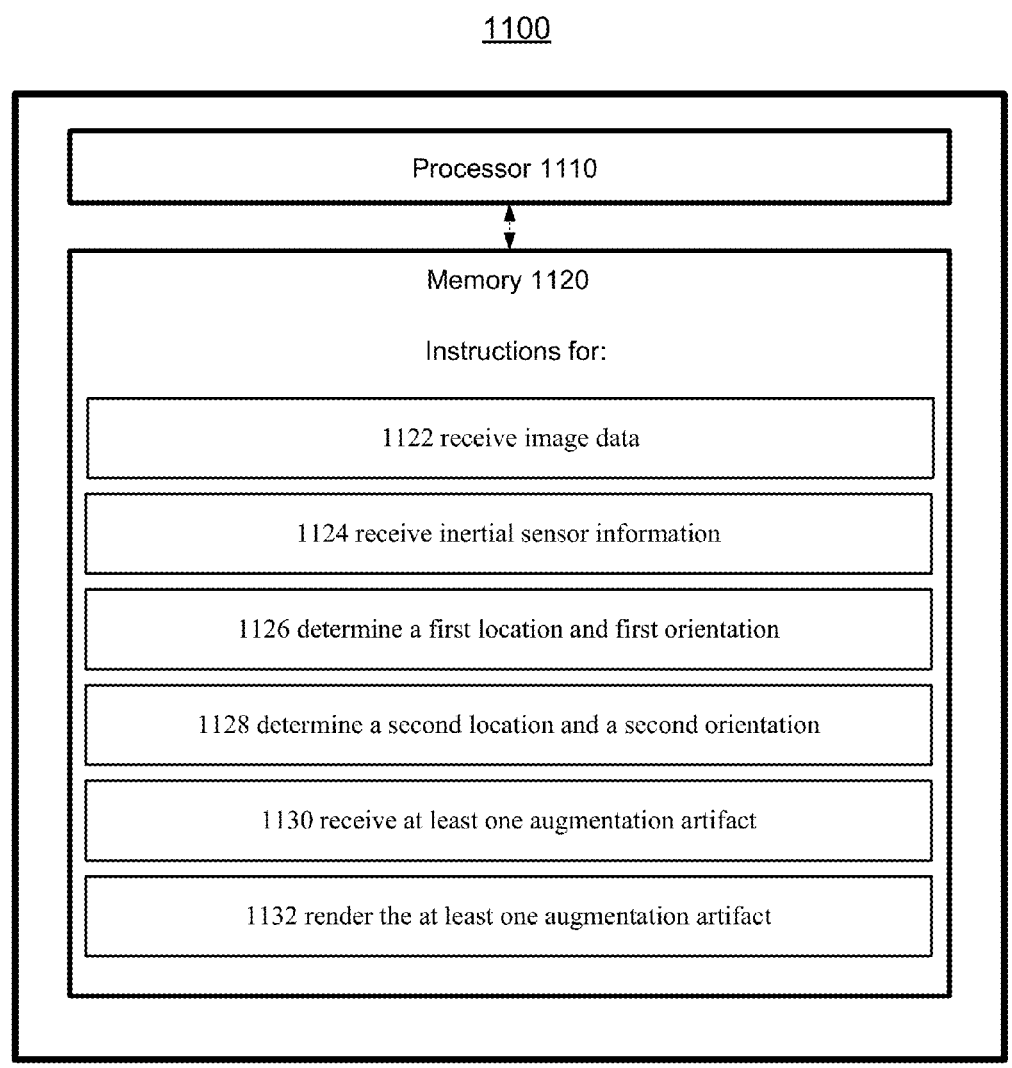
FIG. 11 illustrates an example system for augmenting location based data.

FIG. 11 depicts an exemplary system for compressing data for augmenting location based data as described above. Referring to FIG. 11, system 1100 comprises a process 1110 and memory 1120. Memory 1120 further comprises computer instructions configured to store augmentation artifact data in a data store. The augmentation artifact data may comprise a plurality of media entities, and may be associated with at least one object associated with a geographic location. Block 1122 illustrates receiving from an image capture device at least one set of image data representative of at least one object. Block 1124 illustrates receiving inertial sensor information indicating a relative movement of said image capture device. Block 1126 illustrates determining a first location and first orientation for said image capture device as a function of at least one geographically invariant point on said at least one object. Block 1128 illustrates determining a second location and a second orientation of said image capture device, the second location and second orientation determined as a function of said inertial sensor information and said first location and said first orientation. Block 1130 illustrates receiving at least one augmentation artifact comprising a media entity associated with said first location and said first orientation. Block 1132 illustrates rendering the at least one augmentation artifact on a display device as a function of said second location and second orientation.

Figure 12:
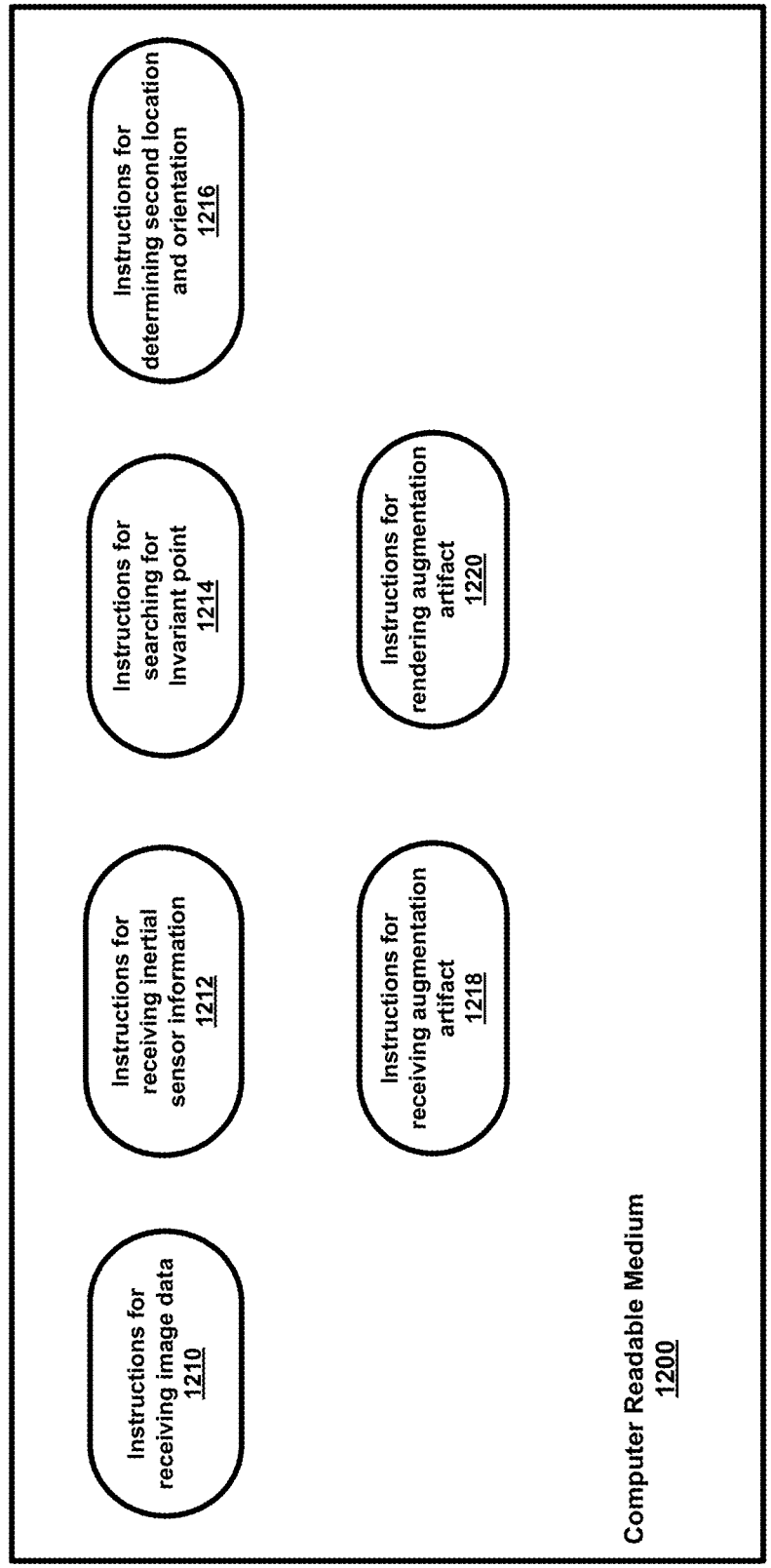
FIG. 12 illustrates a computer readable medium bearing computer executable instructions discussed with respect to FIGS. 1-11.

Any of the above mentioned aspects can be implemented in methods, systems, computer readable media, or any type of manufacture. For example, per FIG. 12, a computer readable medium can store thereon computer executable instructions for augmenting location based data. Such media can comprise a first subset of instructions for receiving from the image capture device at least one set of image data representative of at least one object 1210; a second subset of instructions for receiving inertial sensor information indicating a relative movement of said image capture device and estimating a first location and first orientation for said image capture device using the inertial sensor information 1212; a third subset of instructions for searching for the at least one geographically invariant point in accordance with the estimated first location and first orientation and determining the first location and first orientation for said image capture device as a function of the at least one geographically invariant point 1214; a fourth set of instructions for determining a second location and a second orientation of said image capture device, the second location and second orientation determined by combining said inertial sensor information and said first location and said first orientation 1216; a fifth set of instructions for receiving at least one augmentation artifact comprising a media entity associated with said first location and said first orientation 1218; and a sixth set of instructions for rendering the at least one augmentation artifact on said computing device as a function of said second location and second orientation 1220. It will be appreciated by those skilled in the art that additional sets of instructions can be used to capture the various other aspects disclosed herein, and that the presently disclosed subsets of instructions can vary in detail per the present disclosure.

Exemplary Networked and Distributed Environments

As described above, aspects of the disclosure may execute on a programmed computer. FIG. 1 and the following discussion is intended to provide a brief description of a suitable computing environment in which the those aspects may be implemented. One of ordinary skill in the art can appreciate that a computer or gaming console, or other client or server device, including handheld communications devices, mobile telephones, personal data assistants (PDAs), or any other device with computing and communications capabilities, can be deployed as part of a computer network, or in a distributed computing environment. In this regard, the present disclosure pertains to any dynamic perspective video window system, computer system, or virtual or augmented reality environment system as described herein, having any number of memory or storage units, and any number of applications and processes occurring across any number of storage units or volumes, which may be used in connection with an augmented reality system. The present disclosure may apply to an environment with server computers and client computers deployed in a network environment or distributed computing environment having remote or local storage. The present disclosure may also be applied to standalone computing devices, having programming language functionality, interpretation and execution capabilities for generating, receiving and transmitting information in connection with one or more dynamic perspective video window systems.

Distributed computing facilities may share computer resources and services by direct exchange between computing devices and systems, such as transmission of a captured user-facing or scene-facing image by a detector or camera to a computing device configured to communicate with several detectors or cameras. These resources and services include the exchange of information, cache storage, and disk storage for files. Distributed computing takes advantage of network connectivity, allowing clients to leverage their collective power to create and participate in sophisticated virtual environments. In this regard, a variety of devices may have applications, objects or resources that may implicate an augmented reality system that may utilize the techniques of the present subject matter.

FIG. 1 provides a schematic diagram of an exemplary networked or distributed system in which one or more dynamic perspective video window systems may be implemented, in some embodiments as part of a virtual or augmented reality environment system. The distributed system comprises server computing objects 10a, 10b, etc. and computing objects or devices 120a, 120b, 120c, etc. These objects may be personal computers, gaming consoles, portable devices, mobile communications devices, or any other computing device. These objects may comprise programs, methods, data stores, programmable logic, etc. The objects may comprise portions of the same or different devices such as personal digital assistants (PDAs), televisions, Moving Picture Experts Group (MPEG-1) Audio Layer-3 (MP3) players, televisions, personal computers, etc. Each object can communicate with another object by way of the communications network 14. This network may itself comprise other computing objects and computing devices that provide services to the system of FIG. 8. This network may include wired and/or wireless components. In accordance with an aspect of the present disclosure, each object 10a, 10b, etc. or 120a, 120b, 120c, etc. may contain an application that might function as a component or element of an augmented reality system.

In a distributed computing architecture, computers, which may have traditionally been used solely as clients, communicate directly among themselves and can act as both clients and servers, assuming whatever role is most efficient for the network or the virtual or augmented reality environment system. This reduces the load on servers and allows all of the clients to access resources available on other clients, thereby increasing the capability and efficiency of the entire network. A virtual or augmented reality environment system or an augmented reality system in accordance with the present disclosure may thus be distributed among servers and clients, acting in a way that is efficient for the entire system.

Distributed computing can help users of dynamic perspective video window systems interact and participate in a virtual or augmented reality environment across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally, or determine anomalous behavior such as a virus and stop it before it affects the network. All sorts of other services may be contemplated as well. Since a virtual or augmented reality environment system may in practice be physically located in one or more locations, the ability to distribute information and data associated with a virtual or augmented reality environment system is of great utility in such a system.

It can also be appreciated that an object, such as 120c, may be hosted on another computing device 10a, 10b, etc. or 120a, 120b, etc. Thus, although the physical environment depicted may show the connected devices as computers, such illustration is merely exemplary and the physical environment may alternatively be depicted or described comprising various digital devices such as gaming consoles, PDAs, televisions, mobile telephones, cameras, detectors, etc., software objects such as interfaces, COM objects and the like.

There are a variety of systems, components, and network configurations that may support dynamic perspective video window systems. For example, computing systems and detectors or cameras may be connected together by wired or wireless systems, by local networks, or by widely distributed networks. Currently, many networks are coupled to the Internet, which provides the infrastructure for widely distributed computing and encompasses many different networks.

The Internet commonly refers to the collection of networks and gateways that utilize the Transport Control Protocol/Interface Program (TCP/IP) suite of protocols, which are well-known in the art of computer networking. The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1, computers 120a, 120b, etc. can be thought of as clients and computers 10a, 10b, etc. can be thought of as the server where server 10a, 10b, etc. maintains the data that is then replicated in the client computers 120a, 120b, etc.

A server is typically a remote computer system accessible over a local network such as a LAN or a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 1 illustrates an exemplary networked or distributed environment, with a server in communication with client computers via a network/bus, in which the present disclosure may be employed. In more detail, a number of servers 10a, 10b, etc., are interconnected via a communications network/bus 14, which may be a LAN, WAN, intranet, the Internet, etc., with a number of client or remote computing devices 120a, 120b, 120c, 120d, 120e, etc., such as a portable computer, handheld computer, thin client, networked appliance, mobile telephone, personal computer, gaming console, or other device, in accordance with the present disclosure. It is thus contemplated that the present disclosure may apply to any computing device that may communicate, interact, and/or operate in or with an augmented reality system.

In a network environment in which the communications network/bus 14 is the Internet, for example, the servers 10a, 50b, etc. can be web servers with which the clients 120a, 120b, 120c, 120d, 120e, etc. communicate via any of a number of known protocols such as HTTP. Servers 10a, 10b, etc. may also serve as clients 120a, 120b, 120c, 120d, 120e, etc., as may be characteristic of a distributed virtual environment or a distributed dynamic perspective video window system. Communications may be wired or wireless, where appropriate. Client devices 120a, 120b, 120c, 120d, 120e, etc. may or may not communicate via communications network/bus 14, and may have independent communications associated therewith. Each client computer 120a, 120b, 120c, 120d, 120e, etc. and server computer 10a, 10b, etc. may be equipped with various application program modules or objects 135 and with connections or access to various types of storage elements or objects, across which files, images, or frames may be stored or to which portion(s) of files, images, or frames may be downloaded or migrated. Any computers 10a, 10b, 120a, 120b, 120c, 120d, 120e, etc. may be responsible for the maintenance and updating of database 100 or other storage element in accordance with the present subject matter, such as a database or memory 100 for storing dynamic perspective video window system data, such as captured, augmented, and/or modified files, images, and/or frames. Database 100 and one or more of computers 10a, 10b, 120a, 120b, 120c, 120d, 120e, etc, may form elements of an augmented reality system as described herein that may interact or be a component of an augmented reality system according to the present disclosure. Thus, the present disclosure can be utilized in a computer network environment having client computers 120a, 120b, 120c, 120d, 120e, etc. that can access and interact with a computer network/bus 14 and server computers 10a, 10b, etc. that may interact with client computers 120a, 120b, 120c, 120d, 120e, etc. and other like devices, and databases 100.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

Exemplary Computing Environment

Figure 2:
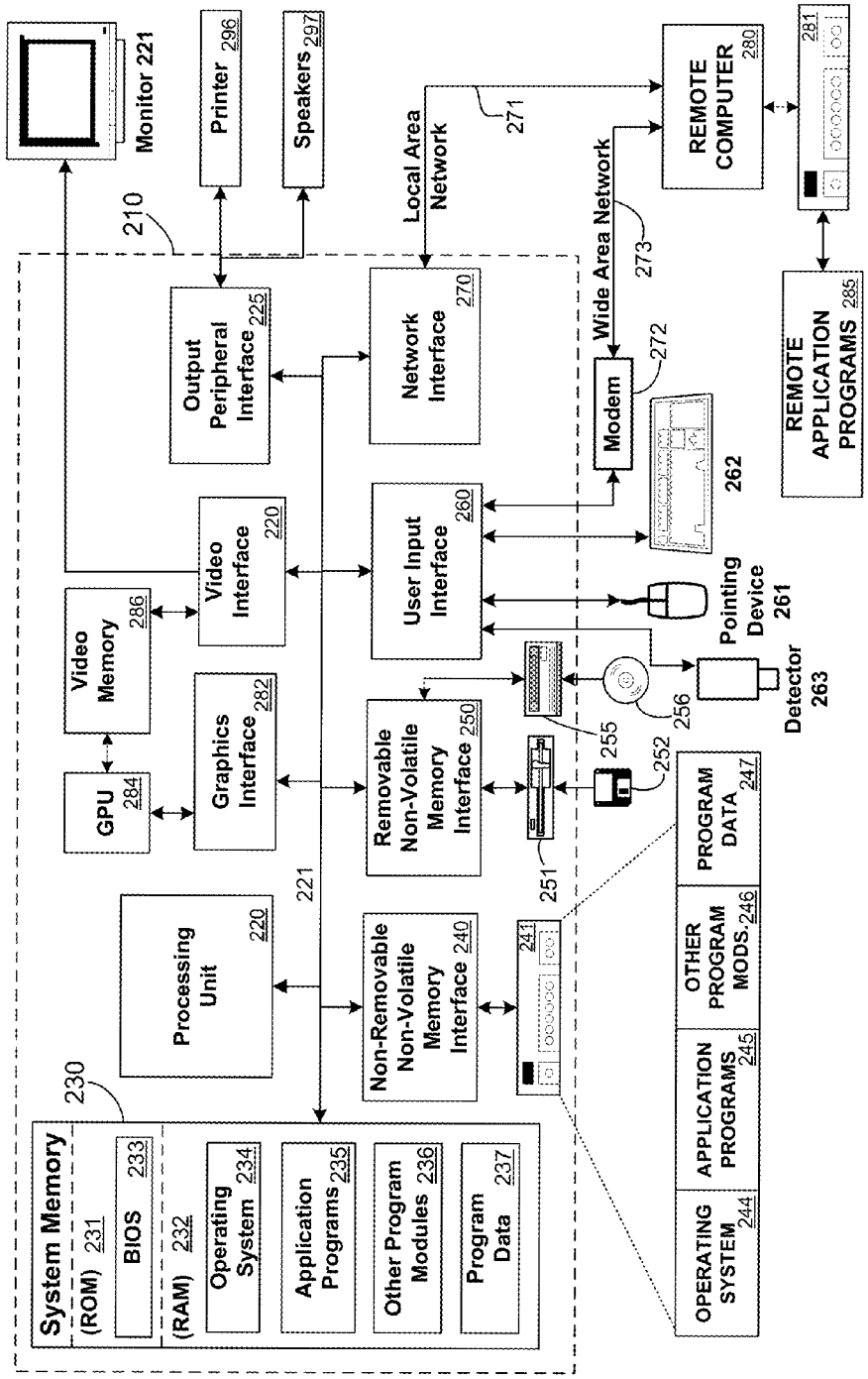
FIG. 2 is a block diagram representing an exemplary non-limiting computing device in which the present disclosure or parts thereof may be implemented.

FIG. 2 and the following discussion are intended to provide a brief general description of a suitable computing environment in which the present disclosure or parts thereof may be implemented. It should be understood, however, that handheld, portable and other computing devices and computing objects of all kinds are contemplated for use in connection with the present disclosure, as described above. Thus, while a general purpose computer is described below, this is but one example, and the present disclosure may be implemented with other computing devices, such as a thin client having network/bus interoperability and interaction. The present disclosure may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that an augmented reality system may be employed is a desirable, or suitable, environment for the dynamic perspective video window systems of the disclosure.

Although not required, the present disclosure can be implemented via an operating system, for use by a developer of services for a device or object, and/or included within application software that operates in connection with an augmented reality system. Software may be described in the general context of computer-executable instructions, such as program modules, being executed by one or more computers, such as client workstations, servers, gaming consoles, mobile devices, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the present disclosure may be practiced with other computer system configurations. Other well known computing systems, environments, and/or configurations that may be suitable for use with the present subject matter include, but are not limited to, personal computers (PCs), gaming consoles, automated teller machines, server computers, hand-held or laptop devices, multi-processor systems, microprocessor-based systems, programmable consumer electronics, network PCs, appliances, environmental control elements, minicomputers, mainframe computers, digital cameras, wireless telephones, and the like. The disclosure may also be practiced in distributed computing environments where tasks are performed by remote processing devices that are linked through a communications network/bus or other data transmission medium, as described herein in regard to FIG. 2. In a distributed computing environment, program modules may be located in both local and remote computer storage media including memory storage devices, and client nodes may in turn behave as server nodes.

FIG. 2 thus illustrates an example of a suitable computing system environment 200 in which the present subject matter or parts thereof may be implemented, although as made clear above, computing system environment 200 is only one example of a suitable computing environment and is not intended to suggest any limitation as to the scope of use or functionality of the disclosure. Devices functioning as components or parts of an augmented reality system may be implemented using a system such as computing system environment 200, but those skilled in the art will recognize that there are other appropriate systems in which to implement the present disclosure. Computing system environment 200 should not be interpreted as having any dependency or requirement relating to any one or combination of components illustrated in the exemplary operating environment 200.

With reference to FIG. 2, an exemplary system for implementing the disclosure includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus.)

Computer 210 typically includes a variety of computer-readable media. Computer-readable media can be any available media that can be accessed by computer 210 and includes both volatile and nonvolatile media and removable and non-removable media. By way of example, and not limitation, computer-readable media may comprise computer storage media and communication media. Computer storage media includes both volatile and nonvolatile and removable and non-removable media implemented in any method or technology for storage of information such as computer-readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium that can be used to store the desired information and that can accessed by computer 210. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during startup, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

Computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 241 is typically connected to the system bus 221 through an non-removable memory interface such as interface 240, and magnetic disk drive 251 and optical disk drive 255 are typically connected to system bus 221 by a removable memory interface, such as interface 250.

The drives and their associated computer storage media discussed above and illustrated in FIG. 2 provide storage of computer-readable instructions, data structures, program modules and other data for computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into computer 210 through input devices such as a keyboard 262 and pointing device 261, commonly referred to as a mouse, trackball or touch pad. Alternatively, pointing device 261 may be a controller used with a gaming console. Detector 263 may communicate with computer 210 through interface 260 to provide images, video frames, and/or other detected information or data to computer 210. Detector 263 may be a camera of any type, or any other type of detection device. Other input devices (not shown) may include a microphone, joystick, game pad, satellite dish, scanner, or the like.

These and other input devices are often connected to processing unit 220 through a user input interface 260 that is coupled to system bus 221, but may be connected by other interface and bus structures, such as a parallel port, game port or a universal serial bus (USB). A graphics interface 282 may also be connected to system bus 221. One or more graphics processing units (GPUs) 284 may communicate with graphics interface 282. In this regard, GPUs 284 generally include on-chip memory storage, such as register storage and GPUs 284 communicate with a video memory 286. GPUs 284, however, are but one example of a coprocessor and thus a variety of coprocessing devices may be included in computer 210. A monitor 221 or other type of display device may also connect to system bus 221 via an interface, such as a video interface 220, which may in turn communicate with video memory 286. In addition to monitor 221, computers may also include other peripheral output devices such as speakers 227 and printer 226, which may be connected through an output peripheral interface 225.

Computer 210 may operate in a networked or distributed environment using logical connections to one or more remote computers, such as a remote computer 280. Remote computer 280 may be a personal computer, a server, a router, a network PC, a peer device or other common network node, and typically includes many or all of the elements described above relative to computer 210, although only a memory storage device 281 has been illustrated in FIG. 2. The logical connections depicted in FIG. 2 include a local area network (LAN) 271 and a wide area network (WAN) 273, but may also include other networks/buses, including wireless networks. Such networking environments are commonplace in homes, offices, enterprise-wide computer networks, intranets and the Internet.

When used in a LAN networking environment, computer 210 is connected to LAN 271 through a network interface or adapter 270. When used in a WAN networking environment, computer 210 typically includes a modem 272 or other means for establishing communications over WAN 273, such as the Internet. Modem 272, which may be internal or external, may be connected to system bus 221 via user input interface 260, or other appropriate mechanism. In a networked environment, program modules depicted relative to computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers, including all wired and wireless means, may be used.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the disclosure described herein have been shown and described, it will be apparent to those skilled in the art that, based upon the teachings herein, changes and modifications may be made and, therefore, the appended claims are to encompass within their scope all such changes and modifications as are within the true spirit and scope of the disclosures described herein.

What is claimed is:

1. In a computing device comprising a processor, memory, and a display, a method for augmenting location based data, the method comprising:

receiving, from an image capture device, image data representative of at least one object in a vicinity of a first location and a first orientation for said image capture device;

determining the first location and first orientation as a function of at least one geographically invariant point determined from said image data, the geographically invariant point determined based on one or more feature descriptors that are extracted from an object in an image that can be used to distinguish the object from other objects in the image;

determining a second location and a second orientation of said image capture device, the second location and second orientation determined as a function of inertial sensor information indicative of a relative movement of said image capture device and said first location and said first orientation;

sending, to a server via a communications network, the second location and second orientation;

receiving, from the server via the communications network, a media entity associated with said second location and said second orientation and metadata indicative of a type of data associated with the media entity and information for rendering the media entity on the display, said media entity determined based at least on the second location and second orientation and usable to augment images of the second location captured by said image capture device; and rendering the media entity on said display based on said second location and second orientation.

2. The method of claim 1, wherein said inertial sensor information comprises at least one of accelerometer data or angular velocity data.

3. The method of claim 1, wherein said determining comprises discarding said first location and said first orientation when said first location and said first orientation meets a predetermined criterion.

4. The method of claim 2, wherein said accelerometer data is received from triaxial accelerometers mounted on said image capture device such that each accelerometer axis deviates from a gravity vector when said image capture device is oriented for typical device usage.

5. The method of claim 1, wherein said inertial sensor information comprises data sampled at a rate that at least matches a capture rate of said image capture device.

6. The method of claim 1, wherein said second location and second orientation are determined by combining said inertial sensor information with said first location and first orientation.

7. The method of claim 1, wherein said determining the second location and the second orientation comprises applying an estimation filter.

8. The method of claim 1, wherein a measurement bias estimate is adjusted as a function of said second location, said second orientation, and said inertial sensor information.

9. The method of claim 1, further comprising:
storing said second location and second orientation;
receiving from the image capture device updated image data;
receiving updated inertial sensor information; and
determining a third location and a third orientation of said image capture device, the third location and third orientation determined as a function of said updated inertial sensor information and said second location and said second orientation.

10. The method of claim 9, further comprising storing said updated inertial sensor information when the updated inertial sensor information is received while the third location and third orientation are being determined.

11. The method of claim 10, further comprising updating the stored second location and second orientation as a function of the updated inertial sensor information and correcting the updated inertial sensor information as a function of a sensor bias.

12. The method of claim 10, further comprising:
when said third location and third orientation has been determined, updating the third location and third orientation as a function of the updated inertial sensor information.

13. The method of claim 11, wherein updating the stored second location and second orientation is performed as a function of the at least one geographically invariant point and the received inertial sensor information.

14. The method of claim 13, further comprising narrowing a field of search for the at least one geographically invariant point by predicting a new location of the at least one geographically invariant point based on the received inertial sensor information.

15. The method of claim 14, further comprising eliminating search zones that conflict with the predicted new location.

16. A system configured to augment location based data, comprising:
at least one processor;
a data store; and
at least one memory communicatively coupled to said at least one processor, the memory having stored therein computer-executable instructions that, when executed, cause the system to performs steps comprising:
receive from an image capture device at least one set of image data representative of at least one object;
determine a first location and first orientation for said image capture device as a function of at least one geographically invariant point on said at least one object, the geographically invariant point determined based on one or more feature descriptors that are extracted from an object to distinguish the object from other objects in an image;
determine a second location and a second orientation of said image capture device, the second location and second orientation determined as a function of inertial sensor information indicative of a relative movement of said image capture device and said first location and said first orientation;
send, to a server via a communications network, the at least one set of image data and the second location and second orientation;
receive, from the server via the communications network, a media entity associated with said second location and said second orientation and metadata indicative of a type of data associated with the media entity and information for rendering the media entity on a display device, said media entity determined based at least on the second location and second orientation and usable to augment images of the second location captured by said image capture device; and
render the media entity on the display device based on said second location and second orientation.

17. The system of claim 16, wherein said determine the second location and the second orientation comprises applying an estimation filter.

18. The system of claim 16, further comprising estimating the relative movement of said image capture device based on the inertial sensor information.

19. The system of claim 18, wherein said determine the second location and the second orientation further comprises searching for the at least one geographically invariant point in accordance with the estimated relative movement of said image capture device.

20. A computing device comprising:
at least one processor; and
at least one memory communicatively coupled to said at least one processor, the memory having stored therein computer-executable instructions that, when executed by the at least one processor, cause the computing device to:
receive from an image capture device at least one set of image data representative of at least one object;

receive inertial sensor information indicating a relative movement of said image capture device and estimating a first location and first orientation for said image capture device using the inertial sensor information;

search for the at least one geographically invariant point in accordance with the estimated first location and first orientation and determining the first location and first orientation for said image capture device as a function of the at least one geographically invariant point, the geographically invariant point determined based on one or more feature descriptors that are extracted from an object in an image and comprise a point or part of interest in the object;

determine a second location and a second orientation of said image capture device, the second location and second orientation determined by combining said inertial sensor information indicating the relative movement of said image capture device and said first location and said first orientation;

send, to a server via a communications network, the at least one set of image data and the second location and second orientation;

receive, from the server via the communications network, a media entity associated with said second location and said second orientation and metadata indicative of a type of data associated with the media entity and information for rendering the media entity on a display, said media entity determined based at least on the second location and second orientation and usable to augment images of the second location captured by said image capture device; and render the media entity on said display based on said second location and second orientation.

* * * * *